US012764745B2

(12) United States Patent
Sridharan et al.

(10) Patent No.: US 12,764,745 B2
(45) Date of Patent: Oct. 13, 2026

(54) MULTI-SLOT TRANSMISSION OCCASIONS

(71) Applicant: QUALCOMM Incorporated, San Diego, CA (US)

(72) Inventors: Gokul Sridharan, Sunnyvale, CA (US); Peter Gaal, San Diego, CA (US); Seyedkianoush Hosseini, San Diego, CA (US); Hung Dinh Ly, San Diego, CA (US); Hari Sankar, San Diego, CA (US); Sanghoon Kim, San Jose, CA (US); Nachiket Bapat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 17/649,656

(22) Filed: Feb. 1, 2022

(65) Prior Publication Data

US 2022/0256531 A1 Aug. 11, 2022

Related U.S. Application Data

(60) Provisional application No. 63/146,304, filed on Feb. 5, 2021.

(51) Int. Cl.
*H04W 72/0446* (2023.01)
*H04L 1/08* (2006.01)
(Continued)

(52) U.S. Cl.
CPC ............... *H04W 72/21* (2023.01); *H04L 1/08* (2013.01); *H04W 72/0446* (2013.01); *H04W 72/23* (2023.01)

(58) Field of Classification Search
CPC . H04W 72/21; H04W 72/0446; H04W 72/23; H04L 1/08; H04L 5/0051;
(Continued)

(56) References Cited

U.S. PATENT DOCUMENTS

| | | | | |
|---|---|---|---|---|
| 11,895,661 B2 * | 2/2024 | Su | ......................... | H04W 72/51 |
| 2024/0215015 A1 * | 6/2024 | Su | ......................... | H04L 5/1469 |

FOREIGN PATENT DOCUMENTS

| | | | | |
|---|---|---|---|---|
| WO | 2020222299 A1 | 11/2020 | | |
| WO | WO-2020234932 A1 * | 11/2020 | ........... | H04L 5/0007 |
| WO | WO-2021071414 A1 * | 4/2021 | ............... | H04L 1/08 |

OTHER PUBLICATIONS

VIVO—"Discussion on solutions for PUSCH coverage enhancements" 3GPP Draft: R1-2007680: 650 Route Des Lucioles: F-06921 Sophia-Antipolis Cedex; France: Oct. 26, 2020 (Oct. 26, 2020) (Year: 2020).*

(Continued)

*Primary Examiner* — Sujoy K Kundu
*Assistant Examiner* — Samuel Dilan Rutnam
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of one or more sets of contiguous time domain resources for a multi-slot transmission occasion that spans multiple slots. The UE may transmit an uplink transmission in the multi-slot transmission occasion. Numerous other aspects are described.

30 Claims, 15 Drawing Sheets

(51) Int. Cl.
*H04W 72/21* (2023.01)
*H04W 72/23* (2023.01)

(58) Field of Classification Search
CPC ... H04L 5/0053; H04L 5/0091; H04L 5/0094; H04L 1/1819; H04L 1/1864; H04L 1/189; H04L 1/1893
See application file for complete search history.

(56) References Cited

OTHER PUBLICATIONS

International Search Report and Written Opinion—PCT/US2022/070484—ISA/EPO—May 18, 2022.

Nokia, et al., "Discussion on Approaches and Solutions for NR PUSCH Coverage Enhancement", 3GPP TSG RAN WG1 #103, R1-2009792, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 14, 2020, XP051954435, 16 Pages.

VIVO: "Discussion on Solutions for PUSCH Coverage Enhancement", 3GPP TSG RAN WG1 #103-e, R1-2007680, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020, pp. 1-9, XP051939837.

* cited by examiner

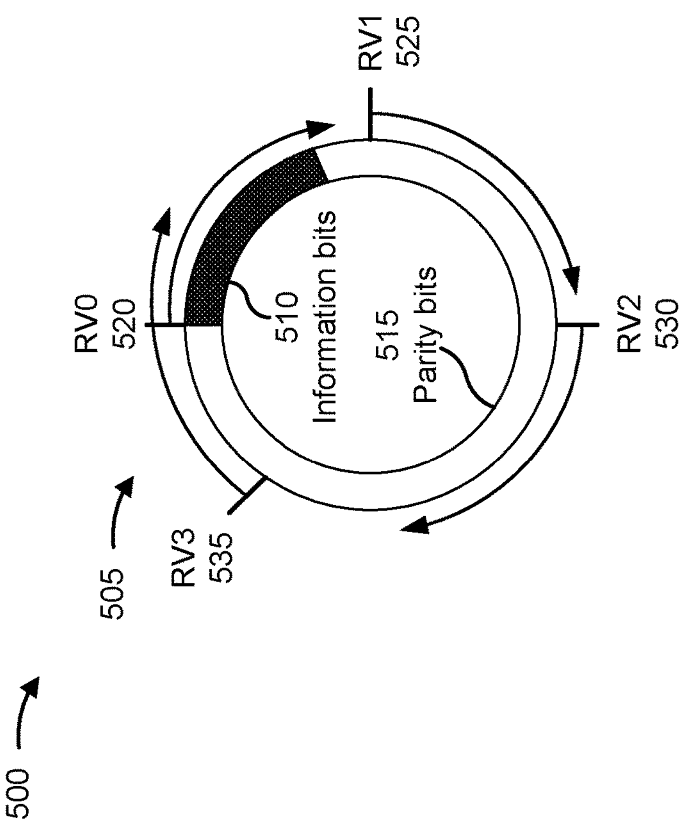

540

| RV | BG1 | BG2 |
|---|---|---|
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

545

Redundancy version for PUSCH transmission

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | $n$ mod 4 = 0 | $n$ mod 4 = 1 | $n$ mod 4 = 2 | $n$ mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

FIG. 5

MULTI-SLOT TRANSMISSION OCCASIONS

CROSS-REFERENCE TO RELATED APPLICATION

This patent application claims priority to U.S. Provisional Patent Application No. 63/146,304, filed on Feb. 5, 2021, entitled "MULTI-SLOT TRANSMISSION OCCASIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multi-slot transmission occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication of one or more sets of contiguous time domain resources for a multi-slot transmission occasion that spans multiple slots; and transmitting an uplink transmission in the multi-slot transmission occasion.

In some aspects, a method of wireless communication performed by a network entity includes transmitting, to a UE, an indication of one or more sets of contiguous time domain resources for a multi-slot transmission occasion that spans multiple slots; and receiving an uplink transmission from the UE in the multi-slot transmission occasion.

In some aspects, a UE for wireless communication includes a memory and one or more processors coupled to the memory, the one or more processors configured to: receive an indication of one or more sets of contiguous time domain resources for a multi-slot transmission occasion that spans multiple slots; and transmit an uplink transmission in the multi-slot transmission occasion.

In some aspects, a network entity for wireless communication includes a memory and one or more processors coupled to the memory, the one or more processors configured to: transmit, to a UE, an indication of one or more sets of contiguous time domain resources for a multi-slot transmission occasion that spans multiple slots; and receive an uplink transmission from the UE in the multi-slot transmission occasion.

In some aspects, a non-transitory computer-readable medium storing a set of instructions for wireless communication includes one or more instructions that, when executed by one or more processors of a UE, cause the UE to: receive an indication of one or more sets of contiguous time domain resources for a multi-slot transmission occasion that spans multiple slots; and transmit an uplink transmission in the multi-slot transmission occasion.

In some aspects, a non-transitory computer-readable medium storing a set of instructions for wireless communication includes one or more instructions that, when executed by one or more processors of a network entity, cause the network entity to: transmit, to a UE, an indication of one or more sets of contiguous time domain resources for a multi-slot transmission occasion that spans multiple slots; and receive an uplink transmission from the UE in the multi-slot transmission occasion.

In some aspects, an apparatus for wireless communication includes means for receiving an indication of one or more sets of contiguous time domain resources for a multi-slot transmission occasion that spans multiple slots; and means for transmitting an uplink transmission in the multi-slot transmission occasion.

In some aspects, an apparatus for wireless communication includes means for transmitting, to a UE, an indication of one or more sets of contiguous time domain resources for a multi-slot transmission occasion that spans multiple slots; and means for receiving an uplink transmission from the UE in the multi-slot transmission occasion.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of redundancy version cycling based on uplink transmission occasions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
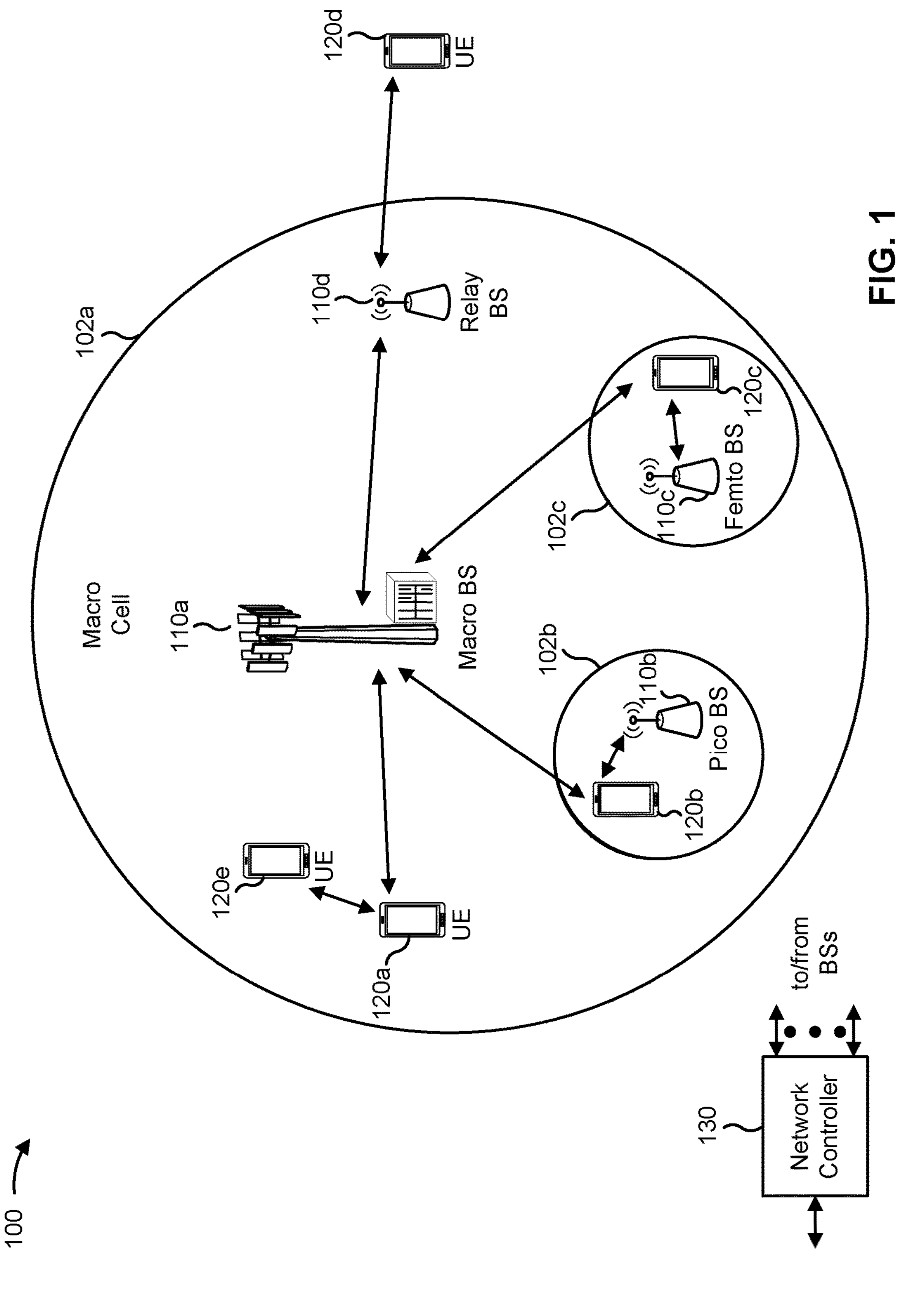
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
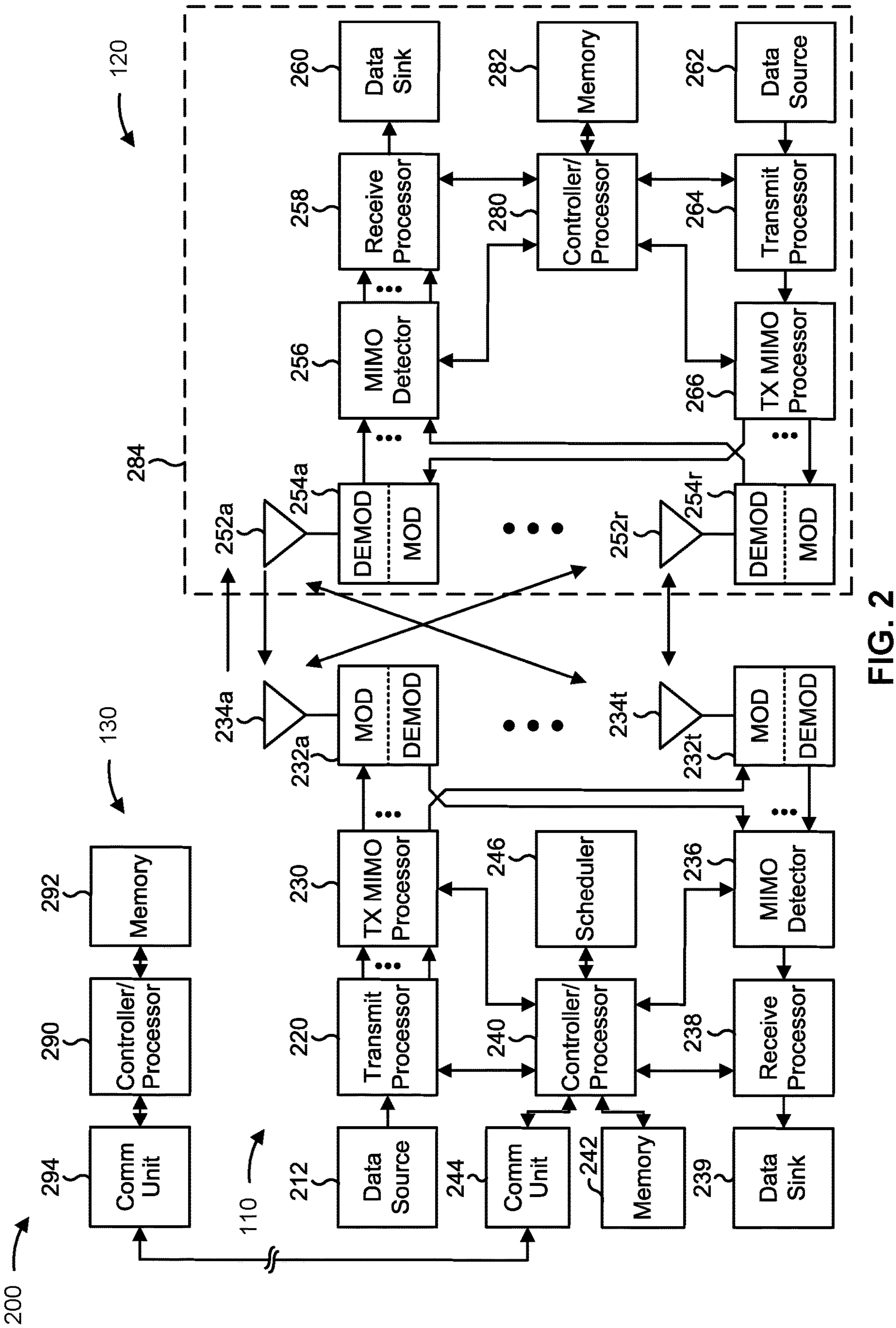
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-7).

The controller/processor 240 of the base station 110, the controller/processor 280 of the UE 120, and/or any other component(s) of FIG. 2 may perform one or more techniques associated with multi-slot transmission occasions, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving an indication of one or more sets of contiguous time domain resources for a multi-slot transmission occasion that spans multiple slots; and/or means for transmitting an uplink transmission in the multi-slot transmission occasion. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication of a number of repetitions of the uplink transmission to be transmitted by the UE; and/or means for transmitting a set of repetitions of the uplink transmission based at least in part on the indication of the number of repetitions, wherein each repetition of the set of repetitions is transmitted in a different multi-slot transmission occasion.

In some aspects, the UE includes means for receiving an indication of a time gap between consecutive multi-slot transmission occasions to be used for repetitions of the uplink transmission; and/or means for transmitting a set of repetitions of the uplink transmission based at least in part on the indication of the time gap, wherein each repetition of the set of repetitions is transmitted in a different multi-slot transmission occasion.

In some aspects, the UE includes means for transmitting a set of repetitions of the uplink transmission, wherein each repetition of the set of repetitions is transmitted in a different multi-slot transmission occasion. In some aspects, the UE includes means for transmitting a capability report. In some aspects, the UE includes means for receiving the indication of the one or more sets of contiguous time domain resources for the multi-slot transmission occasion based at least in part on the capability report.

In some aspects, the network entity includes means for transmitting, to a UE, an indication of one or more sets of contiguous time domain resources for a multi-slot transmission occasion that spans multiple slots; and/or means for receiving an uplink transmission from the UE in the multi-slot transmission occasion. The means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the network entity includes means for transmitting an indication of a number of repetitions of the uplink transmission to be transmitted by the UE; and/or means for receiving a set of repetitions of the uplink transmission based at least in part on the indication of the number of repetitions, wherein each repetition of the set of repetitions is received in a different multi-slot transmission occasion.

In some aspects, the network entity includes means for transmitting an indication of a time gap between consecutive multi-slot transmission occasions to be used for repetitions of the uplink transmission; and/or means for receiving a set of repetitions of the uplink transmission based at least in part on the indication of the time gap, wherein each repetition of the set of repetitions is received in a different multi-slot transmission occasion.

In some aspects, the network entity includes means for receiving a set of repetitions of the uplink transmission, wherein each repetition of the set of repetitions is received in a different multi-slot transmission occasion. In some aspects, the network entity includes means for receiving a capability report. In some aspects, the network entity includes means for transmitting the indication of the one or more sets of contiguous time domain resources for the multi-slot transmission occasion based at least in part on the capability report.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
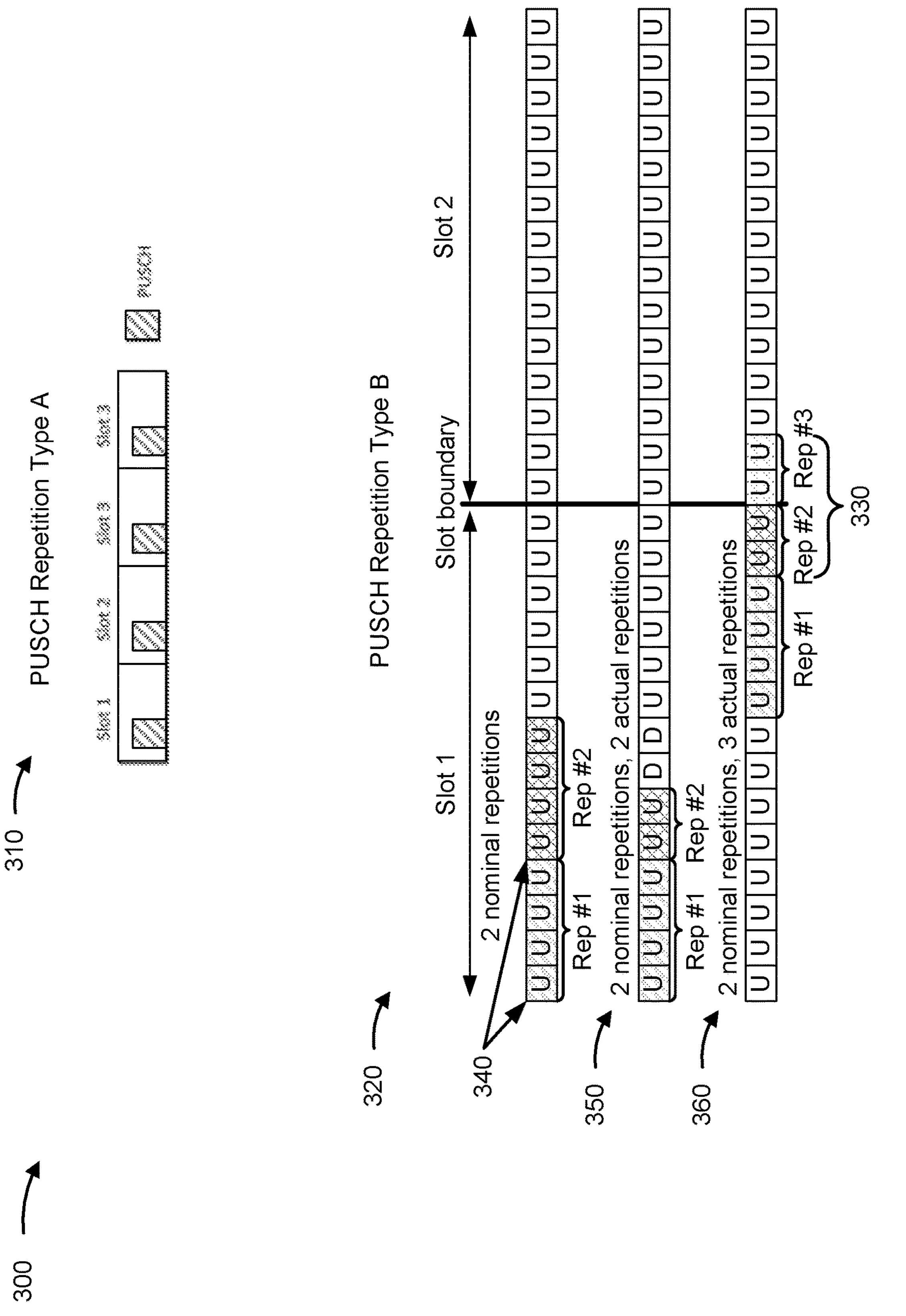
FIG. 3 is a diagram illustrating an example of physical uplink shared channel (PUSCH) Repetition Type A and PUSCH Repetition Type B, in accordance with the present disclosure.

FIG. 3 is a diagram illustrating an example 300 of PUSCH Repetition Type A and PUSCH Repetition Type B, in accordance with the present disclosure. Although techniques are described herein in connection with PUSCH repetitions, these techniques can be applied to various types of uplink repetitions, such as an uplink data repetition, an uplink control repetition (e.g., a physical uplink control channel (PUCCH) repetition), or the like.

A repetition, such as an uplink repetition or a downlink repetition, may be used to improve reliability, such as for ultra reliable low latency communication (URLLC) or for UEs 120 located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. When a UE 120 is configured with repetitions, the UE 120 may retransmit an initial transmission without first receiving feedback (e.g., an acknowledgement (ACK) or negative acknowledgement (NACK)) indicating whether the initial transmission was successfully received. In some aspects, ACK or NACK feedback may be disabled for repetitions, thereby reducing signaling overhead that would otherwise be used for ACK or NACK feedback.

In some aspects, a repeated transmission (sometimes referred to as a retransmission) may include the exact same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term "repetition" is used to refer to the initial communication and is also used to refer to a repeated transmission of the initial communication. For example, if the UE 120 is configured to transmit 4 repetitions, then the UE 120 may transmit an initial transmission and may transmit 3 repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

As shown by reference number 310, for a first uplink repetition type referred to as PUSCH Repetition Type A, uplink transmission occasions are not permitted to cross a slot boundary, and only one uplink transmission occasion is permitted per slot. Thus, if a UE 120 is configured with PUSCH Repetition Type A, then the UE 120 cannot transmit a repetition in a set of symbols that occurs in more than one slot, and can only transmit the repetition if all symbols of the repetition occur in the same slot. Furthermore, if a UE 120 is configured with PUSCH Repetition Type A, then the UE 120 cannot transmit more than one repetition per slot. Thus, for PUSCH Repetition Type A, a transmission occasion corresponds to a slot. Furthermore, for PUSCH Repetition Type A, the time domain allocation for a repetition within a slot may be the same across all slots for which repetitions are scheduled. In other words, each repetition, associated with the same initial transmission, may start in the same starting symbol (e.g., having the same starting symbol index) in each slot in which a repetition is scheduled, and may occupy the same number of symbols.

As shown by reference number 320, for a second uplink repetition type referred to as PUSCH Repetition Type B, uplink transmission occasions are permitted to cross a slot boundary (as shown by reference number 330, where a single nominal repetition crosses a slot boundary and is divided into two actual repetitions), and more than one uplink transmission occasion is permitted per slot (as shown by reference number 340). Thus, if a UE 120 is configured with PUSCH Repetition Type B, then the UE 120 can transmit a repetition (e.g., a nominal repetition) in a set of symbols that occurs in more than one slot, and the UE 120 can transmit the repetition even if all symbols of the repetition do not occur in the same slot. Furthermore, if a UE 120 is configured with PUSCH Repetition Type B, then the UE 120 can transmit more than one repetition per slot. Thus, for PUSCH Repetition Type B, a transmission occasion corresponds to a portion of a slot, such as a mini-slot.

Furthermore, for PUSCH Repetition Type B, the time domain allocation for a repetition within a slot may be different for different repetitions. In other words, different repetitions, associated with the same initial transmission, may start in different starting symbols (e.g., having different starting symbol indexes).

In PUSCH Repetition Type B, the term "nominal repetition" refers to a potential PUSCH repetition as indicated by the base station 110. A nominal repetition signaled or scheduled by the base station 110 may be truncated or divided into one or two "actual repetitions." A nominal repetition consists of a set of consecutive symbols over which the UE 120 is expected to transmit a PUSCH repetition. However, when this set of consecutive symbols crosses a slot boundary, contains semi-static downlink symbols, or encounters (e.g., is scheduled to occur within) an invalid symbol pattern, among other examples, then the UE 120 is required to split the nominal repetition into one or two parts. Each of these parts is then referred to as an "actual repetition."

For example, as shown by reference number 350, a PUSCH transmission may include four symbols, and a base station 110 may configure a UE 120 (e.g., in a radio resource control (RRC) message) to transmit two nominal repetitions of the PUSCH transmission. The two nominal repetitions may span a total of eight symbols and may each include four symbols. The two nominal repetitions are scheduled in the first eight symbols of a slot (shown as Slot 1). For example, the first nominal repetition may be scheduled in the first four symbols of a slot (the first, second, third, and fourth symbols), and the second nominal repetition may be scheduled in the next four symbols of the slot (the fifth, sixth, seventh, and eighth symbols). The first nominal repetition is actually transmitted in the first four symbols and is thus treated as a single actual repetition (shown as "Rep #1"). For the second nominal repetition, the UE 120 actually transmits the first two symbols but cannot transmit the last two symbols because the last two symbols are downlink symbols. Thus, the UE 120 drops the last two symbols, and the resulting actual repetition (shown as "Rep #2") includes only the first two symbols.

As another example, as shown by reference number 360, a PUSCH transmission may include four symbols, and a base station 110 may configure a UE 120 to transmit two nominal repetitions of the PUSCH transmission. The two nominal repetitions may each include four symbols, shown as the ninth, tenth, eleventh, and twelfth symbols of a first slot (Slot 1) for a first nominal repetition, and shown as the thirteenth and fourteenth symbols of the first slot plus the first and second symbols of a second slot (Slot 2) for a second nominal repetition. The first nominal repetition is transmitted in four consecutive symbols and is thus treated as a single actual repetition (shown as "Rep #1"). The second nominal repetition is transmitted in consecutive symbols that cross a slot boundary (e.g., that occur in more than one slot), and is thus divided into two actual repetitions, with a first actual repetition (shown as "Rep #2") being transmitted in a first set of consecutive symbols in the first slot (the thirteenth and fourteenth symbols of Slot 1) and a second actual repetition (shown as "Rep #3) being transmitted in a second set of consecutive symbols in the second slot (the first and second symbols of Slot 2).

As indicated above, FIG. 3 is provided as an example. Other examples may differ from what is described with respect to FIG. 3.

Figure 4:
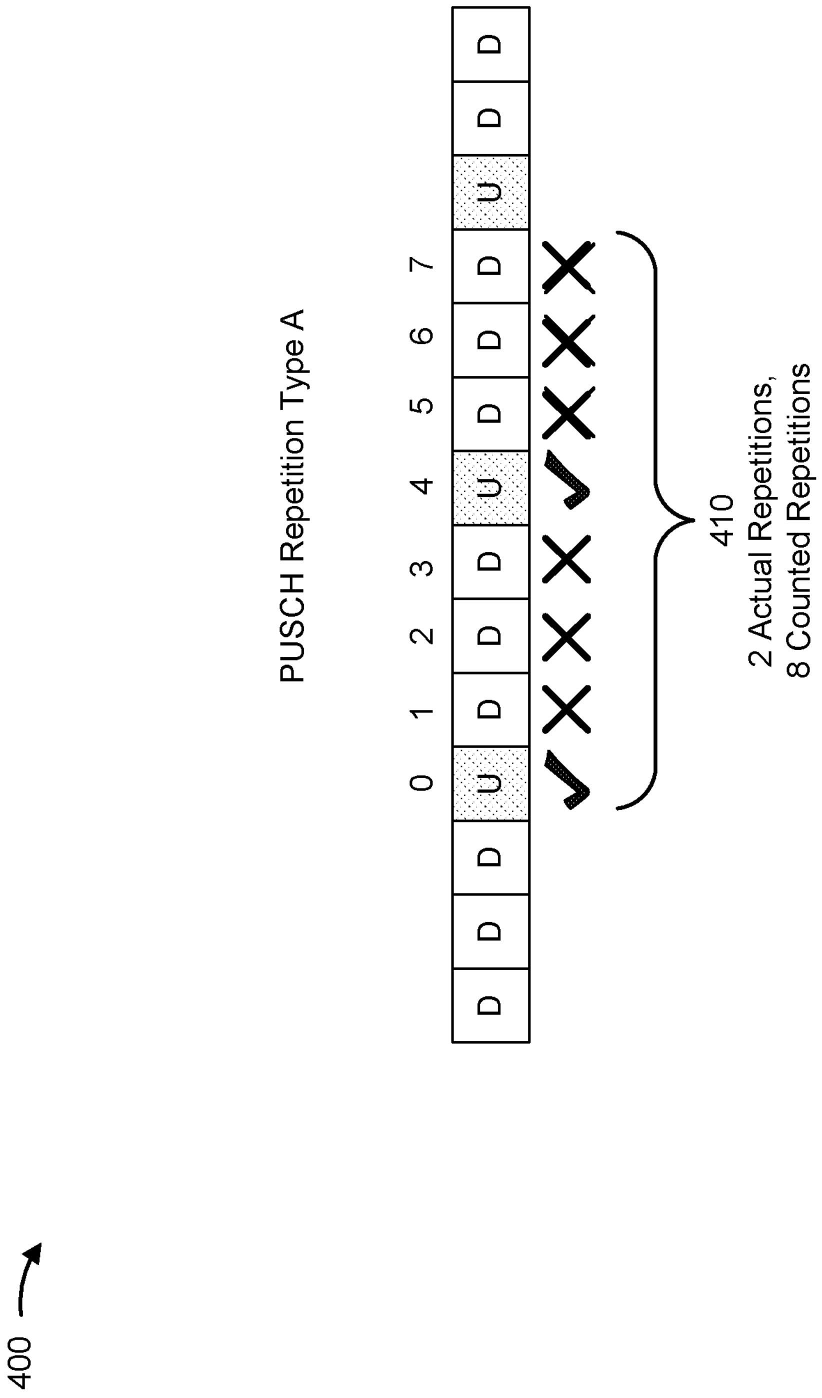
FIG. 4 is a diagram illustrating an example of PUSCH Repetition Type A, in accordance with the present disclosure.

FIG. 4 is a diagram illustrating an example 400 of PUSCH Repetition Type A, in accordance with the present disclosure. FIG. 4 shows an example of counting repetitions for PUSCH Repetition Type A.

In example 400, a time-division duplexing (TDD) slot pattern for communication between a UE 120 and a base station 110 is shown as 3 downlink (D) slots, followed by 1 uplink (U) slot, followed by 3 downlink slots, followed by 1 uplink slot, followed by 3 downlink slots, followed by 1 uplink slot, followed by 2 downlink slots. An uplink slot may be used for uplink communication (and not for downlink communication), and a downlink slot may be used for downlink communication (and not for uplink communication). This is an example TDD slot pattern, and other examples may differ from this TDD slot pattern.

In example 400, a UE 120 is configured with 8 repetitions for PUSCH Repetition Type A. For example, a base station 110 may transmit, to the UE 120, a configuration message (e.g., an RRC message) and/or downlink control information (DCI) (e.g., an uplink grant) that instructs the UE 120 to transmit 8 repetitions (e.g., for PUSCH Repetition Type A, which may also be configured for the UE 120). The configuration message and/or the DCI may include a repetition parameter (e.g., RepK) that indicates the number of repetitions. The configuration message (e.g., for configured grant communications) and/or the DCI (e.g., for dynamic grant communications) may schedule an initial uplink transmission in a slot shown as slot 0, which is an uplink slot.

For PUSCH Repetition Type A, when counting a number of repetitions, the UE 120 and the base station 110 may count consecutive slots, starting with the slot scheduled with the initial uplink transmission, regardless of whether the UE 120 is capable of actually transmitting a repetition in each of those slots. For example, as shown by reference number 410, the UE 120 may transmit a first repetition (e.g., an initial uplink communication) in slot 0 (an uplink slot), may be unable to transmit repetitions in slots 1, 2, and 3 (downlink slots), may transmit a second repetition (e.g., a retransmission or repeated transmission) in slot 4 (an uplink slot), and may be unable to transmit repetitions in slots 5, 6, and 7 (downlink slots). However, the UE 120 and the base station 110 may count the downlink slots 1, 2, 3, 5, 6, and 7 toward the number of repetitions (e.g., the 8 indicated repetitions) despite the UE 120 not being able to transmit in these slots. As a result, the UE 120 terminates repetitions after slot 7 despite having only transmitted 2 repetitions, and not the indicated 8 repetitions.

Alternatively, the UE 120 and the base station 110 may count an actual number of transmitted repetitions (e.g., of actual PUSCH repetition transmissions that are transmitted by the UE 120), rather than counting consecutive slots regardless of whether a repetition is actually transmitted in each of those slots. For example, the UE 120 may be configured with a number of repetitions, and the UE 120 (and the base station 110) may only increment a counter indicative of a number of transmitted repetitions if the UE 120 actually transmits a repetition. In this example, the UE 120 (and the base station 110) may refrain from incrementing the counter when the UE 120 has an opportunity to transmit a repetition (e.g., in a PUSCH transmission occasion) but does not actually transmit a repetition in that opportunity (e.g., because a slot changes from an uplink to a downlink slot, because a transmission is cancelled or preempted, or the like).

As indicated above, FIG. 4 is provided as an example. Other examples may differ from what is described with respect to FIG. 4.

FIG. 5 is a diagram illustrating an example 500 of redundancy version cycling based on uplink transmission occasions, in accordance with the present disclosure. A UE 120 may apply redundancy version cycling to PUSCH repetitions to transmit different redundancy versions of the PUSCH repetition in different transmission occasions.

"Redundancy version" (RV) of a PUSCH repetition refers to a set of encoded bits that are transmitted for that PUSCH repetition. Using RV cycling, the UE 120 transmits a different set of encoded bits in different PUSCH repetitions. For example, the UE 120 may store bits for an uplink transmission in a circular buffer 505 (e.g., stored in memory of the UE 120). The circular buffer 505 stores information bits 510 and parity bits 515 (sometimes called parity-check bits). The information bits 510 may include the data to be transmitted, and the parity bits 515 may include linear combinations of the data (e.g., of the information bits 510). The UE 120 may encode information bits 510, parity bits 515, or a combination of information bits 510 and parity bits 515 into a set of encoded bits, and may transmit the set of encoded bits. The particular bits that are selected to be included in the set of encoded bits for a PUSCH repetition depend on (or are defined by) the RV of that PUSCH repetition.

For example, for a PUSCH repetition having RV0, the UE 120 transmits a sequence of encoded bits (e.g., a particular number of encoded bits) starting at a first location 520 in the circular buffer 505 (e.g., bit 0, or a first information bit). Similarly, the UE 120 transmits a sequence of encoded bits starting at a second location 525 in the circular buffer 505 for a PUSCH repetition having RV1, the UE 120 transmits a sequence of encoded bits starting at a third location 530 in the circular buffer 505 for a PUSCH repetition having RV2, and the UE 120 transmits a sequence of encoded bits starting at a fourth location 535 in the circular buffer 505 for a PUSCH repetition having RV3.

As an example, the starting bit locations may be defined by a table 540, such as for NR hybrid automatic repeat request (HARQ) using low-density parity-check (LDPC) code. The table 540 defines starting bit locations in the circular buffer 505 for a first base graph (BG1) and a second base graph (BG2). A base graph is a parameter for determining parity bits 515 for a transmission based at least in part on a transport block (TB) size and a code rate (with BG1 being intended for TBs with a larger TB size, and BG2 being intended for TBs with a smaller TB size). Referring to the table, $N_{cb}$ represents the length of the circular buffer 505 (e.g., the number of bits included in the circular buffer 505), and $Z_c$ represents a lifting size, which is based at least in part on the number of information bits 510 and the number of BG columns corresponding to information bits 510.

In some examples, a base station 110 may transmit information, such as an RV index, shown as $rv_{id}$, to the UE 120. For example, the base station 110 may transmit the RV index for a PUSCH communication (e.g., a PUSCH transmission) in DCI that schedules the PUSCH communication. The RV index may indicate a sequence of RVs to be applied to a corresponding sequence of PUSCH transmission occasions (e.g., PUSCH opportunities). The UE 120 may increment a counter n (sometimes called an index n) for each uplink transmission occasion following (or indicated by) the DCI. The UE 120 may use the information transmitted by the base station 110 (e.g., the RV index) and the value of the counter n for a particular transmission occasion to determine an RV to be applied to that transmission occasion.

For example, as shown by table 545, for PUSCH Repetition Type A, if the base station 110 indicates an $rv_{id}$ of 0, then the UE 120 may determine an RV to be applied to an $n^{th}$ transmission occasion (e.g., for PUSCH Repetition Type A) by calculating n mod 4, where mod represents a modulo operation. If n mod 4=0 (e.g., for transmission occasion 0, such as Slot 1 shown in connection with reference number 310 of FIG. 3 for PUSCH Repetition Type A), then the UE 120 applies RV0 to that transmission occasion. If n mod 4=1 (e.g., for transmission occasion 1, such as Slot 2 shown in connection with reference number 310 of FIG. 3), then the UE 120 applies RV2 to that transmission occasion. If n mod 4=2 (e.g., for transmission occasion 2, such as Slot 3 shown in connection with reference number 310 of FIG. 3), then the UE 120 applies RV3 to that transmission occasion. If n mod 4=3 (e.g., for transmission occasion 3, such as Slot 4 shown in connection with reference number 310 of FIG. 3), then the UE 120 applies RV1 to that transmission occasion. As shown, the RV index may have a value of 0, 1, 2, or 3, each of which corresponds to a different sequence of RVs (e.g., a different order for RV0, RV1, RV2, and RV3).

Similarly, for PUSCH Repetition Type B, if the base station 110 indicates an $rv_{id}$ of 0, then the UE 120 may determine an RV to be applied to an $n^{th}$ actual repetition (e.g., of PUSCH Repetition Type B) by calculating n mod 4, where mod represents a modulo operation. If n mod 4=0 (e.g., for actual repetition 0, such as Rep #1 shown in connection with reference number 350 of FIG. 3 for PUSCH Repetition Type B), then the UE 120 applies RV0 to that actual repetition. If n mod 4=1 (e.g., for actual repetition 1, such as Rep #2 shown in connection with reference number 350 of FIG. 3), then the UE 120 applies RV2 to that actual repetition. If n mod 4=2 (e.g., for actual repetition 2, such as Rep #3 shown in connection with reference number 350 of FIG. 3), then the UE 120 applies RV3 to that actual repetitions. If n mod 4=3 (e.g., for actual repetition 3, not shown in FIG. 3), then the UE 120 applies RV1 to that actual repetition. As described above in connection with FIG. 3, a UE 120 may or may not actually transmit an actual repetition of PUSCH Repetition Type B.

As indicated above, FIG. 5 is provided as an example. Other examples may differ from what is described with respect to FIG. 5. For example, the RV cycling technique shown in table 545 is one example of an RV cycling technique, and other RV cycling techniques maybe used.

In some examples, a transmission occasion is confined to a single slot and a UE may transmit a transport block (in an uplink transmission) within the slot. In such examples, if the UE has a large number of bits to transmit, the UE will split those bits into multiple TBs and transmit those TBs in different slots. As a result, the payload is segmented into multiple TBs (or segments). Each TB requires processing and insertion of a header and other padding, so transmission of a larger number of TBs increases processing requirements of the UE, increases resource consumption of the UE (e.g., memory and processing resources), and increases signaling overhead as compared to transmission of a smaller number of TBs. Furthermore, transmission of a payload in fewer TBs increases reliability because each TB is separately encoded. By jointly encoding more payload bits in fewer TBs, reliability is improved and more information can be inferred from those TBs as compared to using a larger number of TBs. To enable payload transmission in a smaller number of TBs (with a larger TB size), some techniques and apparatuses described herein enable multi-slot transmission occasions, where a transmission occasion (e.g., an uplink transmission occasion) spans multiple slots. As described above, multi-slot transmission occasions may improve reliability and may conserve network resources and/or UE resources as compared to single-slot transmission occasions, because multi-slot transmission occasions enable more symbols to be used for transmission of a transport block. Although techniques are described herein in connection with uplink transmissions, such techniques may be applied to downlink transmissions in some aspects.

Figure 6:
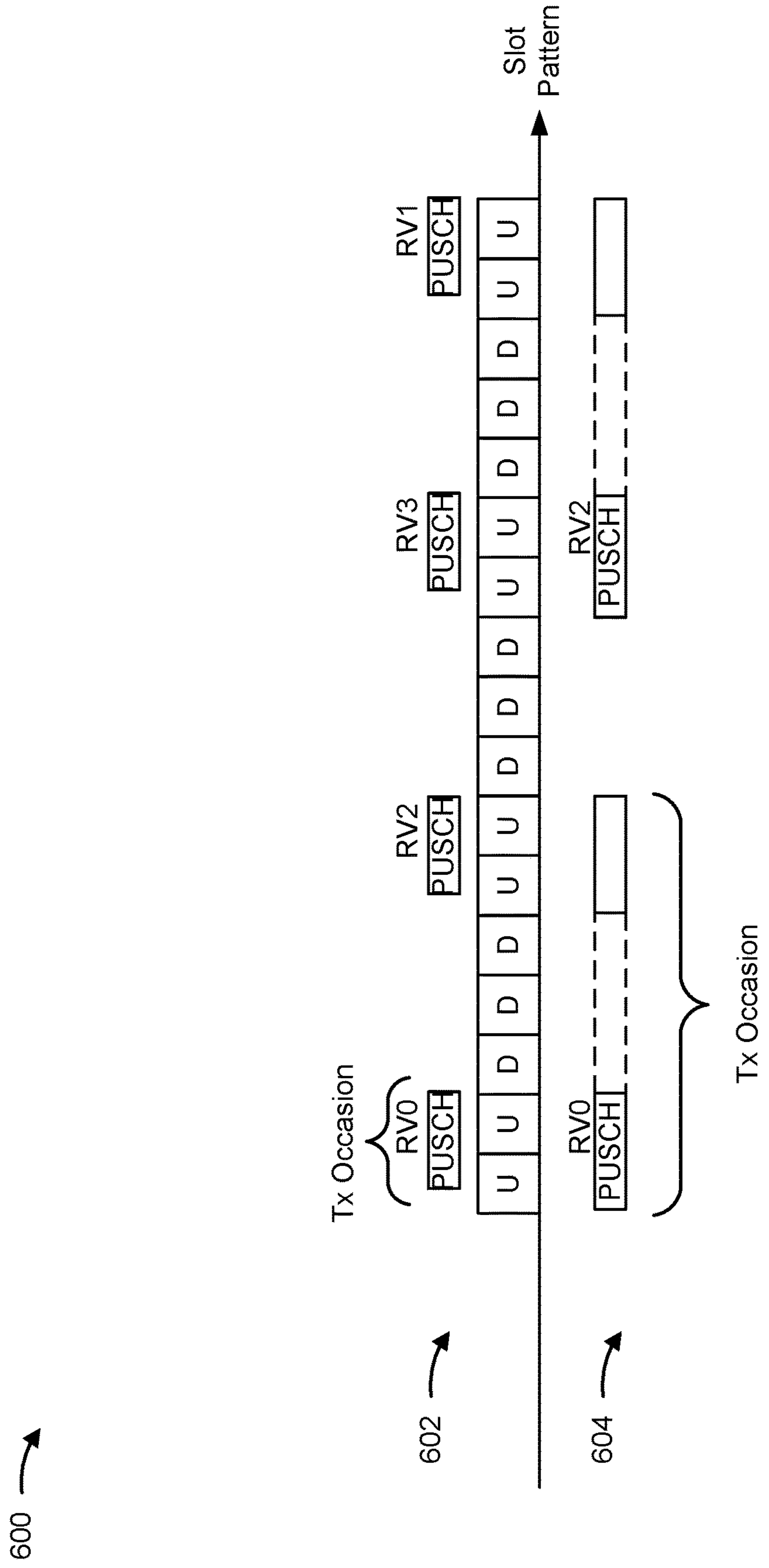
FIGS. 6-8 are diagrams illustrating examples associated with multi-slot transmission occasions, in accordance with the present disclosure.

FIG. 6 is a diagram illustrating an example 600 associated with multi-slot transmission occasions, in accordance with the present disclosure.

In some aspects, a transmission occasion of a multi-slot transmission, such as a multi-slot PUSCH transmission, may constitute a set of contiguous resources (symbols or slots) spanning one or more slots (as shown by reference number 602). The symbols may not need to be from a same slot. In some aspects, the transmission occasion of the multi-slot transmission may constitute multiple sets of contiguous resources (as shown by reference number 604). In some aspects, a single transport block may be transmitted in a transmission occasion. When repetitions are allowed, the transport block may be transmitted over multiple transmission occasions.

As indicated above, FIG. 6 is provided as an example. Other examples may differ from what is described with respect to FIG. 6.

Figure 7:
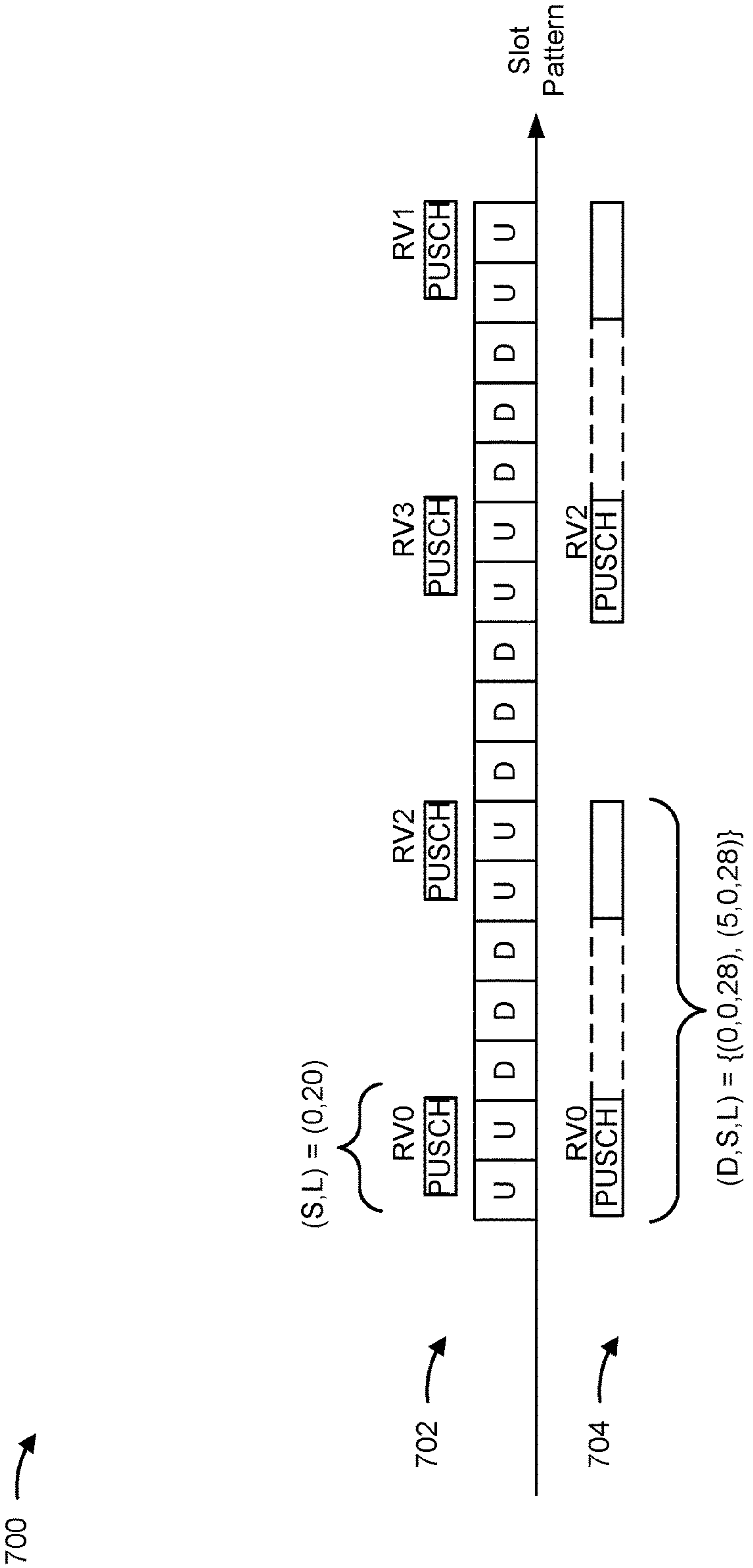

FIG. 7 is a diagram illustrating an example 700 associated with multi-slot transmission occasions, in accordance with the present disclosure.

A time domain resource allocation (TDRA) of a multi-slot transmission occasion may provide a set of consecutive or non-consecutive symbols that constitute a transmission occasion. As shown by reference number 702, a TDRA may be a pair (S,L), where S may indicate a starting symbol and L may indicate a length of a transmission occasion. As shown by reference number 704, a TDRA may be a set of triplets (D,S,L), where D may indicate a slot index relative a certain reference slot, S may indicate a starting symbol in that slot, and L may be a length of a transmission occasion. In some aspects, the reference slot may be a slot in which an uplink grant is received via DCI, or the reference slot may be a slot indicated by DCI as a beginning of a transmission occasion.

As indicated above, FIG. 7 is provided as an example. Other examples may differ from what is described with respect to FIG. 7.

Figure 8:
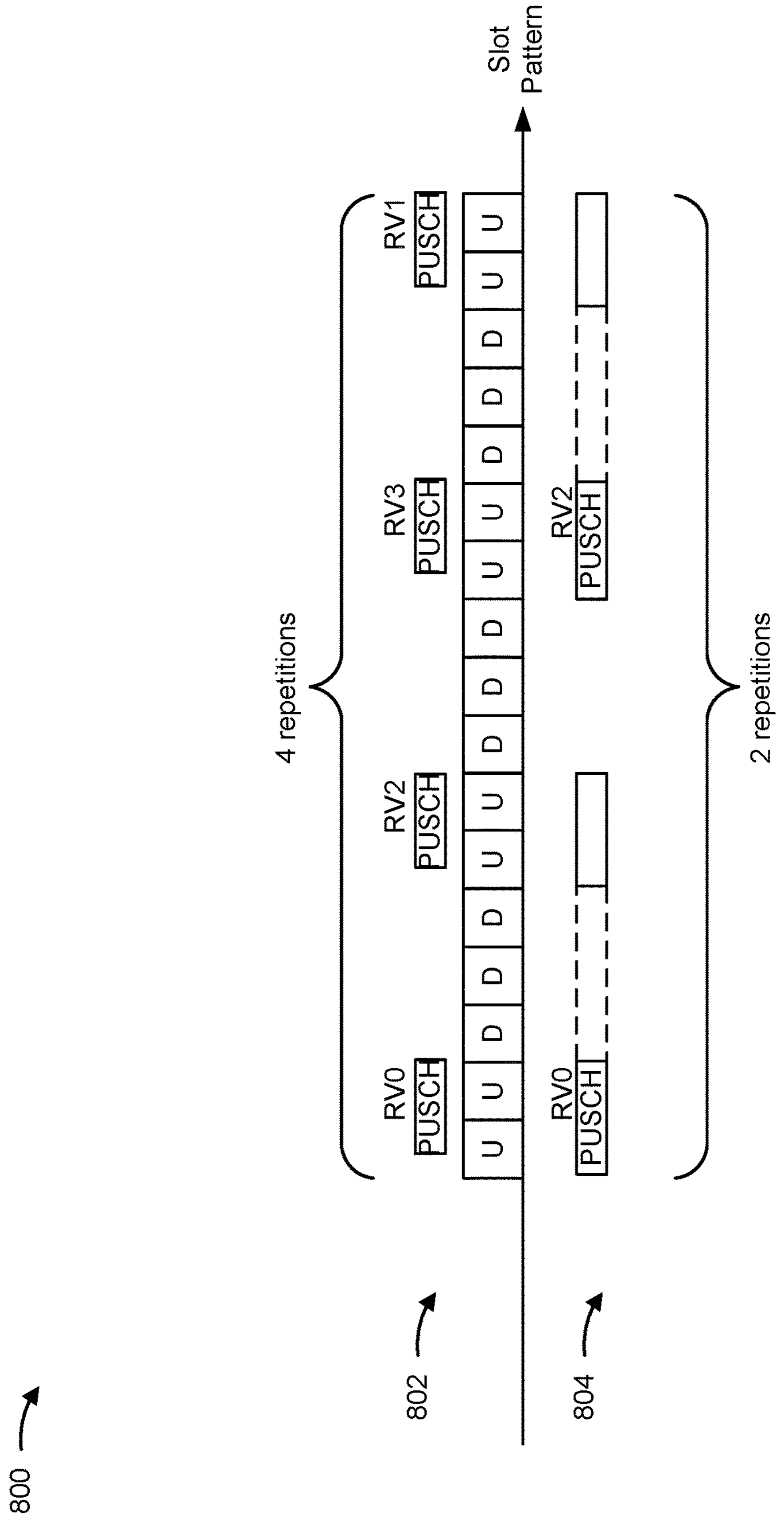

FIG. 8 is a diagram illustrating an example 800 associated with multi-slot transmission occasions, in accordance with the present disclosure.

In some aspects, multi-slot transmission repetitions may occur over a set of transmission occasions. As shown by reference number 802, four repetitions may occur over four transmission occasions. As shown by reference number 804, two repetitions may occur over two transmission occasions. In some aspects, a repetition factor may be included along with a TDRA. In some aspects, along with the TDRA, a certain periodicity or offset parameter may be specified to indicate a spacing of the repetitions. For example, an inter-repetition gap may be specified in symbols or slots. A gap may be measured between an end of one transmission occasion and a beginning of a next transmission occasion, or the gap may be measured between a beginning of one transmission occasion to a beginning of a next transmission occasion.

As indicated above, FIG. 8 is provided as an example. Other examples may differ from what is described with respect to FIG. 8.

Figure 9A:
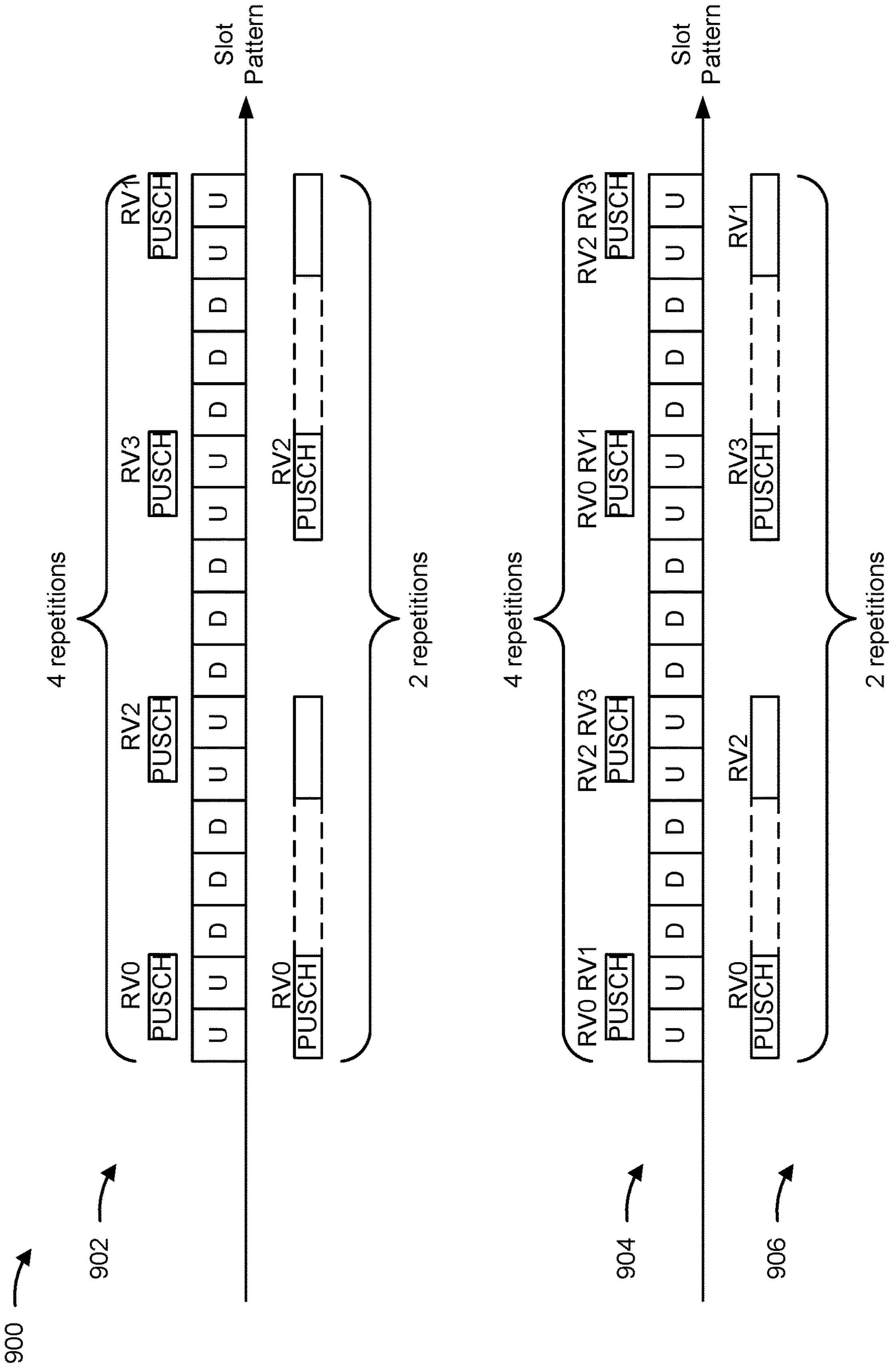
FIGS. 9A-9B are diagrams illustrating examples associated with multi-slot transmission occasions, in accordance with the present disclosure.
Figure 9B:
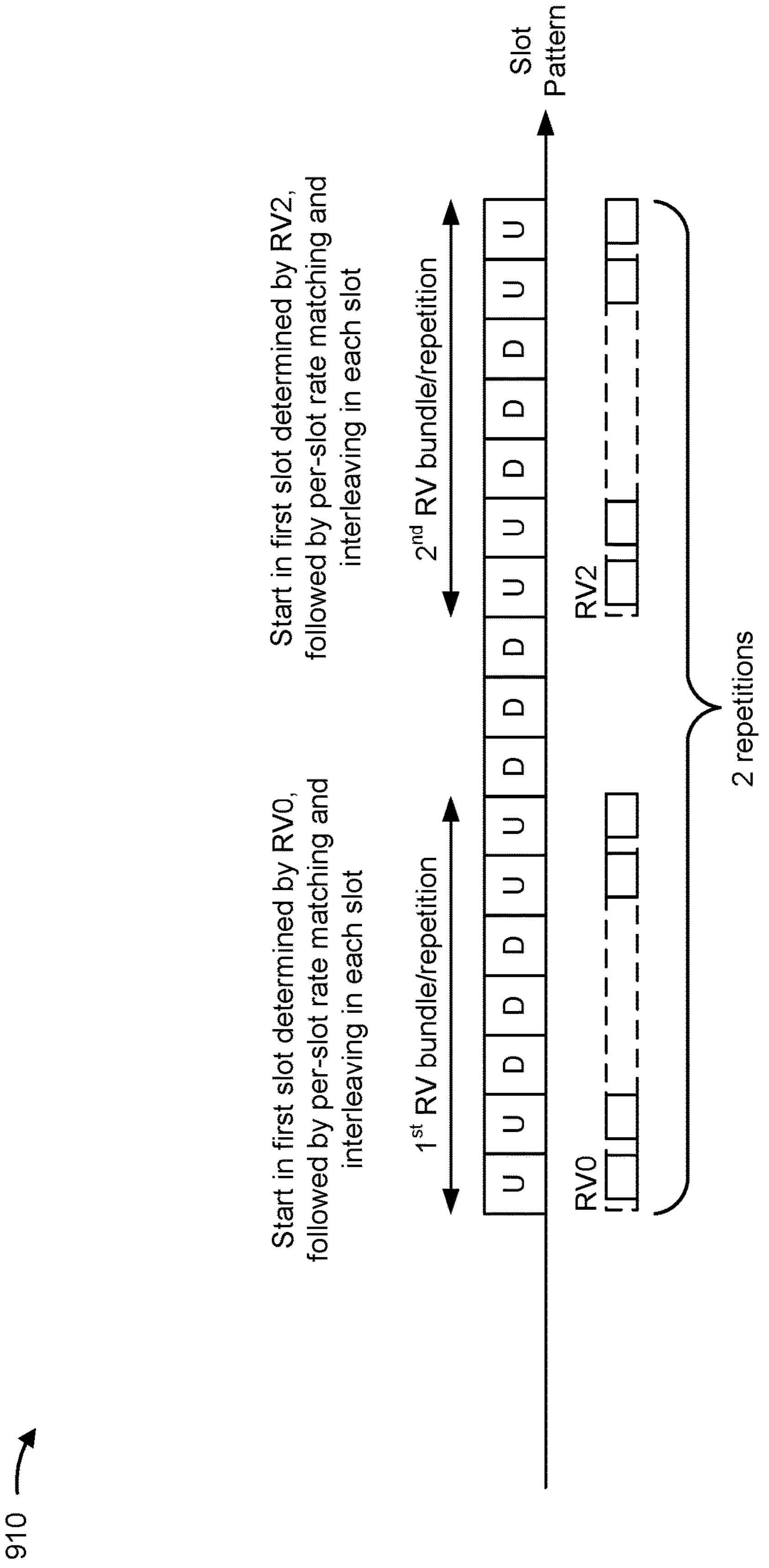

FIG. 9A-9B are diagrams illustrating examples 900, 910 associated with multi-slot transmission occasions, in accordance with the present disclosure.

As shown in FIG. 9A, for each repetition of a multi-slot transmission (e.g., a transmission over a single transmission occasion), a single RV index may be used (as shown by reference number 902), or a single RV index may only be used over symbols contained in a single slot (as shown by reference number 904), or a single RV index may be used only over every consecutive set of symbols (as shown by reference number 906).

As shown in FIG. 9B, a first RV index (e.g., RV0) may be associated with a first RV bundle/repetition, and a second RV index (e.g., RV2) may be associated with a second RV bundle/repetition. In the first RV bundle/repetition, a start in a first slot may be determined using RV0, and may be followed by a per-slot rate matching and interleaving in each slot. In the second RV bundle/repetition, a start in a first slot may be determined using RV2, and may be followed by a per-slot rate matching and interleaving in each slot.

As indicated above, FIGS. 9A-9B are provided as examples. Other examples may differ from what is described with respect to FIGS. 9A-9B.

In some aspects, when determining an RV index, a starting RV index may be identified for each transmission occasion. An inter-transmission occasion RV cycling and an intra-transmission occasion RV cycling may be governed by a same pattern. When RV index usage rules require multiple RV indices to be used within a transmission occasion, an RV index may be incremented or the RV index may be updated as per a configured sequence within a transmission occasion. When moving to a next transmission occasion, a configured sequence may be followed.

As an example, when a UE is configured with an RV sequence of 0,2,3 and 1, then a starting RV index for a first transmission occasion may be 0, a starting RV index for a second transmission occasion may be 2, and so on. When multiple RV indices are needed for the first transmission occasion, an order of 0,2,3,1 may be followed. When multiple RV indices are needed for the second transmission occasion, an order of 2,3,1,0 may be followed.

In some aspects, when determining an RV index, a starting RV index may be identified for each transmission occasion. An inter-transmission occasion RV cycling and an intra-transmission occasion RV cycling may be governed by a different pattern. When RV index usage rules require multiple RV indices to be used within a transmission occasion, an RV index may be incremented or the RV index may be updated as per a configured sequence for an intra-transmission occasion RV cycling within a transmission occasion. When moving to a next transmission occasion, a configured sequence may be followed for inter-transmission occasion RV cycling.

As an example, when a UE is configured with an RV sequence of 0,2,3 and 1 for inter-transmission occasion RV cycling and when the UE is configured an RV sequence of 0,1,2, and 3 for intra-transmission occasion RV cycling, then a starting RV index for a first transmission occasion may be 0, a starting RV index for a second transmission occasion may be 2, and so on. When multiple RV indices are needed for the first transmission occasion, an order of 0,1,2,3 may be followed. When multiple RV indices are needed for the second transmission occasion, an order of 2,3,0,1 may be followed.

In some aspects, a UE may separately or jointly signal various capabilities for multi-slot transmissions, such as an ability to support transmission occasions across non-consecutive symbols, a maximum span (in symbols or slots) of a single transmission occasion, a maximum span or gap (in symbols or slots) between two adjacent sets of consecutive symbols of a transmission occasion, a requirement to use a single RV index for an entire transmission occasion, a requirement to use RV cycling across non-consecutive components of a transmission occasion (e.g., a new RV index for each set of consecutive symbols within a transmission occasion), and/or a requirement to use a new RV index across each slot boundary.

Figure 10:
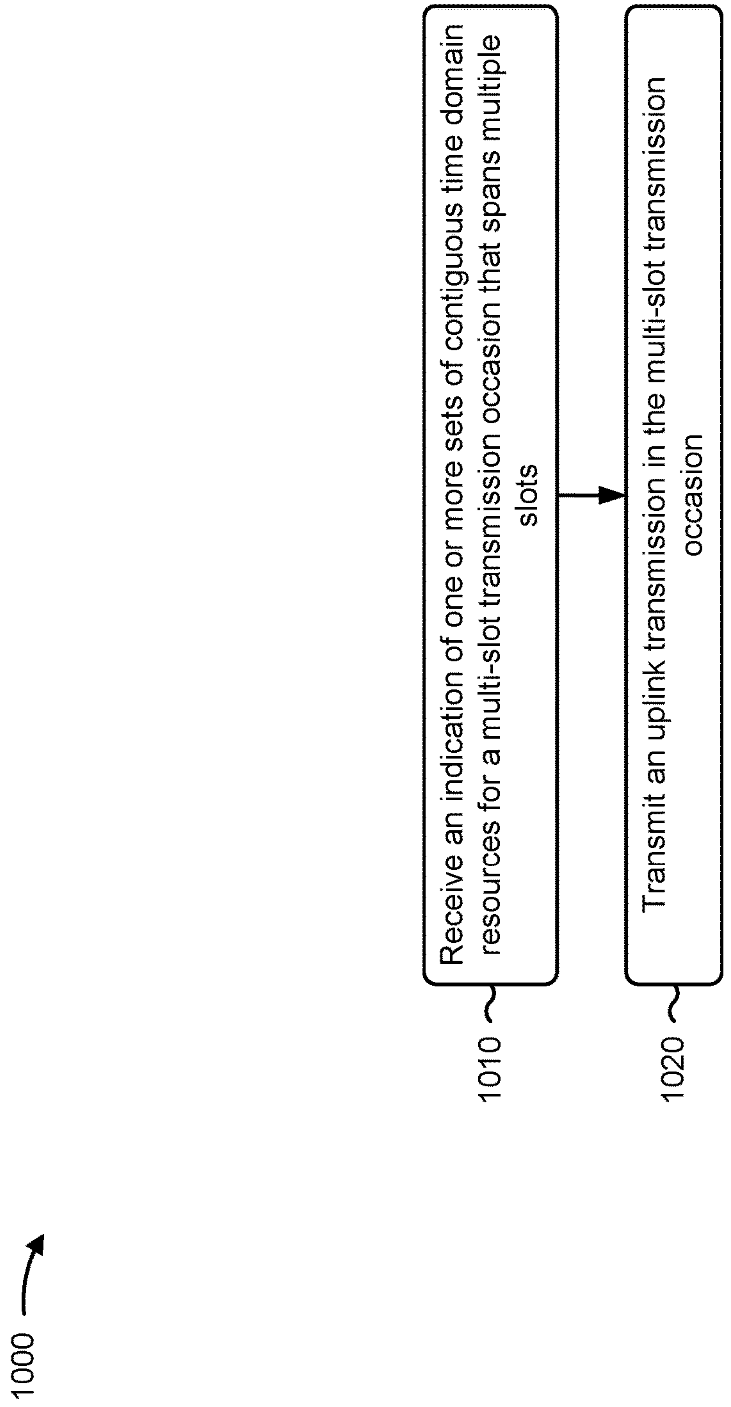
FIGS. 10-11 are diagrams illustrating example processes associated with multi-slot transmission occasions, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with multi-slot transmission occasions.

As shown in FIG. 10, in some aspects, process 1000 may include receiving an indication of one or more sets of contiguous time domain resources for a multi-slot transmission occasion that spans multiple slots (block 1010). For example, the UE (e.g., using reception component 1202, depicted in FIG. 12) may receive an indication of one or more sets of contiguous time domain resources for a multi-slot transmission occasion that spans multiple slots, as described above.

As further shown in FIG. 10, in some aspects, process 1000 may include transmitting an uplink transmission in the multi-slot transmission occasion (block 1020). For example, the UE (e.g., using transmission component 1204, depicted in FIG. 12) may transmit an uplink transmission in the multi-slot transmission occasion, as described above.

Process 1000 may include additional aspects, such as any single aspect or any combination of aspects described below and/or in connection with one or more other processes described elsewhere herein.

In a first aspect, the uplink transmission is a PUSCH transmission that includes a single transport block, and the multi-slot transmission occasion is a multi-slot PUSCH transmission occasion.

In a second aspect, alone or in combination with the first aspect, different sets of contiguous time domain resources are non-contiguous with one another.

In a third aspect, alone or in combination with one or more of the first and second aspects, the one or more sets of contiguous time domain resources for the multi-slot transmission occasion consist of a single set of contiguous time domain resources that span two or more contiguous slots.

In a fourth aspect, alone or in combination with one or more of the first through third aspects, the one or more sets of contiguous time domain resources for the multi-slot transmission occasion comprise multiple sets of contiguous time domain resources, wherein each set of contiguous time domain resources spans two or more contiguous slots, and wherein different sets of contiguous time domain resources are not contiguous with one another.

In a fifth aspect, alone or in combination with one or more of the first through fourth aspects, process 1000 includes receiving an indication of a number of repetitions of the uplink transmission to be transmitted by the UE, and transmitting a set of repetitions of the uplink transmission based at least in part on the indication of the number of repetitions, wherein each repetition of the set of repetitions is transmitted in a different multi-slot transmission occasion.

In a sixth aspect, alone or in combination with one or more of the first through fifth aspects, the indication of the one or more sets of contiguous time domain resources for the multi-slot transmission occasion includes a TDRA for the multi-slot transmission occasion.

In a seventh aspect, alone or in combination with one or more of the first through sixth aspects, the TDRA is indicated using a set of values for a single set of contiguous time domain resources that span two or more contiguous slots of the multi-slot transmission occasion, wherein the set of values includes a first value that indicates a starting symbol of the multi-slot transmission occasion and a second value that indicates a length of the multi-slot transmission occasion.

In an eighth aspect, alone or in combination with one or more of the first through seventh aspects, the TDRA is indicated using multiple sets of values corresponding to multiple sets of contiguous time domain resources of the multi-slot transmission occasion, wherein each set of values includes a first value that indicates a starting slot of the multi-slot transmission occasion, a second value that indicates a starting symbol of the multi-slot transmission occasion within the starting slot, and a third value that indicates a length of the multi-slot transmission occasion.

In a ninth aspect, alone or in combination with one or more of the first through eighth aspects, the first value that indicates the starting slot includes a slot index relative to a reference slot.

In a tenth aspect, alone or in combination with one or more of the first through ninth aspects, the reference slot is a slot in which an uplink grant for the uplink transmission is received.

In an eleventh aspect, alone or in combination with one or more of the first through tenth aspects, the reference slot is a slot indicated in an uplink grant as a starting slot of the multi-slot transmission occasion.

In a twelfth aspect, alone or in combination with one or more of the first through eleventh aspects, process 1000 includes receiving an indication of a time gap between consecutive multi-slot transmission occasions to be used for repetitions of the uplink transmission, and transmitting a set of repetitions of the uplink transmission based at least in part on the indication of the time gap, wherein each repetition of the set of repetitions is transmitted in a different multi-slot transmission occasion.

In a thirteenth aspect, alone or in combination with one or more of the first through twelfth aspects, the time gap is indicated using a periodicity or an offset.

In a fourteenth aspect, alone or in combination with one or more of the first through thirteenth aspects, the time gap is indicated as a number of symbols or a number of slots.

In a fifteenth aspect, alone or in combination with one or more of the first through fourteenth aspects, the time gap indicates a gap between an end of one multi-slot transmission occasion and a beginning of a next consecutive multi-slot transmission occasion.

In a sixteenth aspect, alone or in combination with one or more of the first through fifteenth aspects, the time gap indicates a gap between a beginning of one multi-slot transmission occasion and a beginning of a next consecutive multi-slot transmission occasion.

In a seventeenth aspect, alone or in combination with one or more of the first through sixteenth aspects, process 1000 includes transmitting a set of repetitions of the uplink transmission, wherein each repetition of the set of repetitions is transmitted in a different multi-slot transmission occasion.

In an eighteenth aspect, alone or in combination with one or more of the first through seventeenth aspects, a single redundancy version index is used for the multi-slot transmission occasion, and different redundancy version indexes are used for different multi-slot transmission occasions.

In a nineteenth aspect, alone or in combination with one or more of the first through eighteenth aspects, the one or more sets of contiguous time domain resources for the multi-slot transmission occasion comprise multiple sets of contiguous time domain resources, a single redundancy version index is used for a set of contiguous time domain resources of the multiple sets of contiguous time domain resources, and different redundancy version indexes are used for different sets of contiguous time domain resources included in the multiple sets of contiguous time domain resources.

In a twentieth aspect, alone or in combination with one or more of the first through nineteenth aspects, a single redundancy version index is used for all symbols in a single slot included in the multiple slots of the multi-slot transmission occasion, and different redundancy version indexes are used for different slots included in the multiple slots of the multi-slot transmission occasion.

In a twenty-first aspect, alone or in combination with one or more of the first through twentieth aspects, a same RV cycling pattern is applied for inter-transmission occasion RV cycling and for intra-transmission occasion RV cycling, wherein inter-transmission occasion RV cycling comprises cycling an RV index across multi-slot transmission occasions, and intra-transmission occasion RV cycling comprises cycling an RV index within a single multi-slot transmission occasion.

In a twenty-second aspect, alone or in combination with one or more of the first through twenty-first aspects, a first RV cycling pattern is applied to inter-transmission occasion RV cycling and a second RV cycling pattern is applied to intra-transmission occasion RV cycling, wherein the first RV cycling pattern is different from the second RV cycling pattern, wherein inter-transmission occasion RV cycling comprises cycling an RV index across multi-slot transmission occasions, and intra transmission occasion RV cycling comprises cycling an RV index within a single multi-slot transmission occasion.

Inter-transmission occasion RV cycling comprises cycling or incrementing an RV index across multi-slot transmission occasions, such as by using a first RV index for a first multi-slot transmission occasion, a second RV index for a second multi-slot transmission occasion, and so on. Intra-transmission occasion RV cycling comprises cycling or incrementing an RV index within a multi-slot transmission occasion, such as by using a first RV index for a first set of contiguous symbols within the multi-slot transmission occasion, a second RV index for a second set of contiguous symbols within the multi-slot transmission occasion, and so on.

In a twenty-third aspect, alone or in combination with one or more of the first through twenty-second aspects, process 1000 includes transmitting a capability report that indicates at least one of a capability of the UE to support multi-slot transmission occasions; a maximum span, supported by the UE, of time domain resources for a single multi-slot transmission occasion; a maximum time gap, supported by the UE, between consecutive sets of contiguous time domain resources; a maximum time gap, supported by the UE, between consecutive multi-slot transmission occasions; a requirement to use a single RV index for a single multi-slot transmission occasion; a requirement to use RV cycling across non-consecutive sets of contiguous time domain resources included in a single multi-slot transmission occasion; a requirement to use RV cycling across different slots included in a single multi-slot transmission occasion; or a combination thereof.

In a twenty-fourth aspect, alone or in combination with one or more of the first through twenty-third aspects, process 1000 includes receiving the indication of the one or more sets of contiguous time domain resources for the multi-slot transmission occasion based at least in part on the capability report.

In a twenty-fifth aspect, alone or in combination with one or more of the first through twenty-fourth aspects, the indication of the one or more sets of contiguous time domain resources for the multi-slot transmission occasion is included in downlink control information or an uplink grant for the uplink transmission.

In a twenty-sixth aspect, alone or in combination with one or more of the first through twenty-fifth aspects, the indication of the one or more sets of contiguous time domain resources for the multi-slot transmission occasion is included in an RRC configuration message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
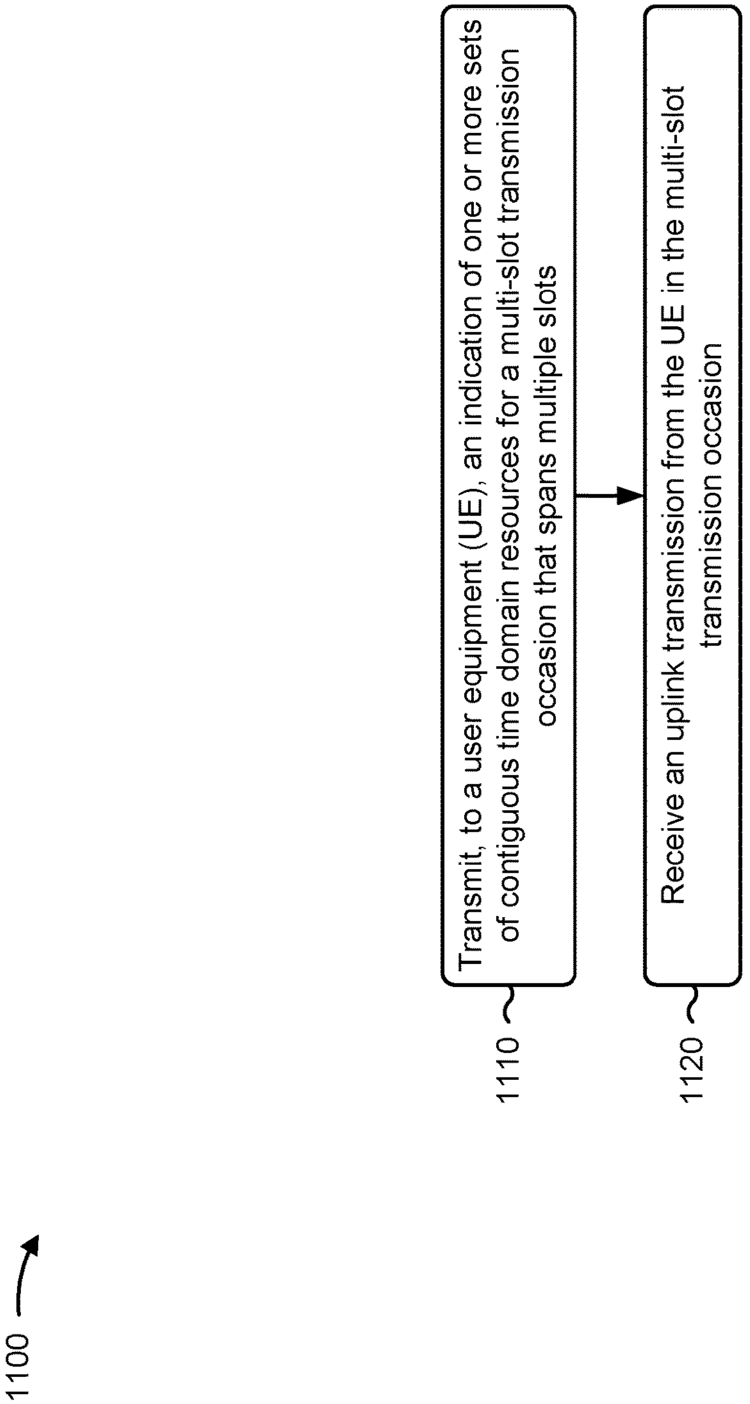

FIG. 11 is a diagram illustrating an example process 1100 performed, for example, by a network entity, in accordance with the present disclosure. Example process 1100 is an example where the network entity (e.g., base station 110) performs operations associated with multi-slot transmission occasions.

As shown in FIG. 11, in some aspects, process 1100 may include transmitting, to a UE, an indication of one or more sets of contiguous time domain resources for a multi-slot transmission occasion that spans multiple slots (block 1110). For example, the network entity (e.g., using transmission component 1304, depicted in FIG. 13) may transmit, to a UE, an indication of one or more sets of contiguous time domain resources for a multi-slot transmission occasion that spans multiple slots, as described above.

As further shown in FIG. 11, in some aspects, process 1100 may include receiving an uplink transmission from the UE in the multi-slot transmission occasion (block 1120). For example, the network entity (e.g., using reception component 1302, depicted in FIG. 13) may receive an uplink transmission from the UE in the multi-slot transmission occasion, as described above.

Process 1100 may include additional aspects, such as any single aspect or any combination of aspects described below and/or in connection with one or more other processes described elsewhere herein.

In a first aspect, the uplink transmission is a PUSCH transmission that includes a single transport block, and the multi-slot transmission occasion is a multi-slot PUSCH transmission occasion.

In a second aspect, alone or in combination with the first aspect, different sets of contiguous time domain resources are non-contiguous with one another.

In a third aspect, alone or in combination with one or more of the first and second aspects, the one or more sets of contiguous time domain resources for the multi-slot transmission occasion consist of a single set of contiguous time domain resources that span two or more contiguous slots.

In a fourth aspect, alone or in combination with one or more of the first through third aspects, the one or more sets of contiguous time domain resources for the multi-slot transmission occasion comprise multiple sets of contiguous time domain resources, wherein each set of contiguous time domain resources spans two or more contiguous slots, and wherein different sets of contiguous time domain resources are not contiguous with one another.

In a fifth aspect, alone or in combination with one or more of the first through fourth aspects, process 1100 includes transmitting an indication of a number of repetitions of the uplink transmission to be transmitted by the UE, and receiving a set of repetitions of the uplink transmission based at least in part on the indication of the number of repetitions, wherein each repetition of the set of repetitions is received in a different multi-slot transmission occasion.

In a sixth aspect, alone or in combination with one or more of the first through fifth aspects, the indication of the one or more sets of contiguous time domain resources for the multi-slot transmission occasion includes a TDRA for the multi-slot transmission occasion.

In a seventh aspect, alone or in combination with one or more of the first through sixth aspects, the TDRA is indicated using a set of values for a single set of contiguous time domain resources that span two or more contiguous slots of the multi-slot transmission occasion, wherein the set of values includes a first value that indicates a starting symbol of the multi-slot transmission occasion and a second value that indicates a length of the multi-slot transmission occasion.

In an eighth aspect, alone or in combination with one or more of the first through seventh aspects, the TDRA is indicated using multiple sets of values corresponding to multiple sets of contiguous time domain resources of the multi-slot transmission occasion, wherein each set of values includes a first value that indicates a starting slot of the multi-slot transmission occasion, a second value that indicates a starting symbol of the multi-slot transmission occasion within the starting slot, and a third value that indicates a length of the multi-slot transmission occasion.

In a ninth aspect, alone or in combination with one or more of the first through eighth aspects, the first value that indicates the starting slot includes a slot index relative to a reference slot.

In a tenth aspect, alone or in combination with one or more of the first through ninth aspects, the reference slot is a slot in which an uplink grant for the uplink transmission is received.

In an eleventh aspect, alone or in combination with one or more of the first through tenth aspects, the reference slot is a slot indicated in an uplink grant as a starting slot of the multi-slot transmission occasion.

In a twelfth aspect, alone or in combination with one or more of the first through eleventh aspects, process 1100 includes transmitting an indication of a time gap between consecutive multi-slot transmission occasions to be used for repetitions of the uplink transmission, and receiving a set of repetitions of the uplink transmission based at least in part on the indication of the time gap, wherein each repetition of the set of repetitions is received in a different multi-slot transmission occasion.

In a thirteenth aspect, alone or in combination with one or more of the first through twelfth aspects, the time gap is indicated using a periodicity or an offset.

In a fourteenth aspect, alone or in combination with one or more of the first through thirteenth aspects, the time gap is indicated as a number of symbols or a number of slots.

In a fifteenth aspect, alone or in combination with one or more of the first through fourteenth aspects, the time gap indicates a gap between an end of one multi-slot transmission occasion and a beginning of a next consecutive multi-slot transmission occasion.

In a sixteenth aspect, alone or in combination with one or more of the first through fifteenth aspects, the time gap indicates a gap between a beginning of one multi-slot transmission occasion and a beginning of a next consecutive multi-slot transmission occasion.

In a seventeenth aspect, alone or in combination with one or more of the first through sixteenth aspects, process 1100 includes receiving a set of repetitions of the uplink transmission, wherein each repetition of the set of repetitions is received in a different multi-slot transmission occasion.

In an eighteenth aspect, alone or in combination with one or more of the first through seventeenth aspects, a single redundancy version index is used for the multi-slot transmission occasion, and different redundancy version indexes are used for different multi-slot transmission occasions.

In a nineteenth aspect, alone or in combination with one or more of the first through eighteenth aspects, the one or more sets of contiguous time domain resources for the multi-slot transmission occasion comprises multiple sets of contiguous time domain resources, a single redundancy version index is used for a set of contiguous time domain resources of the multiple sets of contiguous time domain resources, and different redundancy version indexes are used for different sets of contiguous time domain resources included in the multiple sets of contiguous time domain resources.

In a twentieth aspect, alone or in combination with one or more of the first through nineteenth aspects, a single redundancy version index is used for all symbols in a single slot included in the multiple slots of the multi-slot transmission occasion, and different redundancy version indexes are used for different slots included in the multiple slots of the multi-slot transmission occasion.

In a twenty-first aspect, alone or in combination with one or more of the first through twentieth aspects, a same RV cycling pattern is applied for inter-transmission occasion RV cycling and for intra-transmission occasion RV cycling, wherein inter-transmission occasion RV cycling comprises cycling an RV index across multi-slot transmission occasions, and intra-transmission occasion RV cycling comprises cycling an RV index within a single multi-slot transmission occasion.

In a twenty-second aspect, alone or in combination with one or more of the first through twenty-first aspects, a first RV cycling pattern is applied to inter-transmission occasion RV cycling and a second RV cycling pattern is applied to intra-transmission occasion RV cycling, wherein the first RV cycling pattern is different from the second RV cycling pattern, wherein inter-transmission occasion RV cycling comprises cycling an RV index across multi-slot transmission occasions, and intra-transmission occasion RV cycling comprises cycling an RV index within a single multi-slot transmission occasion.

Inter-transmission occasion RV cycling comprises cycling or incrementing an RV index across multi-slot transmission occasions, such as by using a first RV index for a first multi-slot transmission occasion, a second RV index for a second multi-slot transmission occasion, and so on. Intra-transmission occasion RV cycling comprises cycling or incrementing an RV index within a multi-slot transmission occasion, such as by using a first RV index for a first set of contiguous symbols within the multi-slot transmission occasion, a second RV index for a second set of contiguous symbols within the multi-slot transmission occasion, and so on.

In a twenty-third aspect, alone or in combination with one or more of the first through twenty-second aspects, process 1100 includes receiving a capability report that indicates at least one of a capability of the UE to support multi-slot transmission occasions; a maximum span, supported by the UE, of time domain resources for a single multi-slot transmission occasion; a maximum time gap, supported by the UE, between consecutive sets of contiguous time domain resources; a maximum time gap, supported by the UE, between consecutive multi-slot transmission occasions; a requirement to use a single RV index for a single multi-slot transmission occasion; a requirement to use RV cycling across non-consecutive sets of contiguous time domain resources included in a single multi-slot transmission occasion; a requirement to use RV cycling across different slots included in a single multi-slot transmission occasion; or a combination thereof.

In a twenty-fourth aspect, alone or in combination with one or more of the first through twenty-third aspects, process 1100 includes transmitting the indication of the one or more sets of contiguous time domain resources for the multi-slot transmission occasion based at least in part on the capability report.

In a twenty-fifth aspect, alone or in combination with one or more of the first through twenty-fourth aspects, the indication of the one or more sets of contiguous time domain resources for the multi-slot transmission occasion is included in downlink control information or an uplink grant for the uplink transmission.

In a twenty-sixth aspect, alone or in combination with one or more of the first through twenty-fifth aspects, the indication of the one or more sets of contiguous time domain resources for the multi-slot transmission occasion is included in an RRC configuration message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
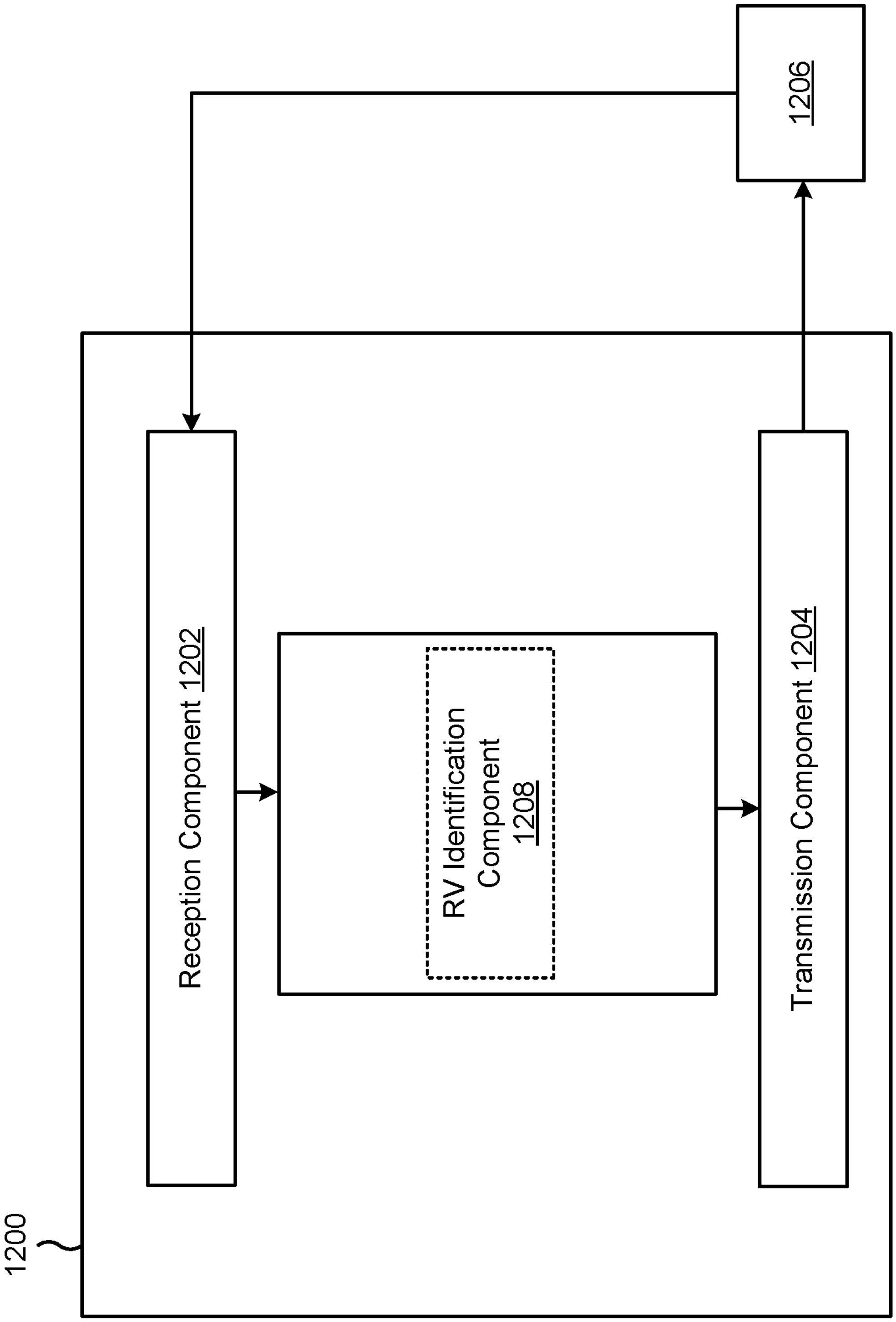
FIGS. 12-13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include an RV identification component 1208, among other examples.

In some aspects, the apparatus 1200 may be configured to perform one or more operations described herein. Additionally, or alternatively, the apparatus 1200 may be configured to perform one or more processes described herein, such as process 600 of FIG. 6. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive an indication of one or more sets of contiguous time domain resources for a multi-slot transmission occasion that spans multiple slots. The transmission component 1204 may transmit an uplink transmission in the multi-slot transmission occasion. The reception component 1202 may receive an indication of a number of repetitions of the uplink transmission to be transmitted by the UE. The transmission component 1204 may transmit a set of repetitions of the uplink transmission based at least in part on the indication of the number of repetitions, wherein each repetition of the set of repetitions is transmitted in a different multi-slot transmission occasion. The reception component 1202 may receive an indication of a time gap between consecutive multi-slot transmission occasions to be used for repetitions of the uplink transmission. The transmission component 1204 may transmit a set of repetitions of the uplink transmission based at least in part on the indication of the time gap, wherein each repetition of the set of repetitions is transmitted in a different multi-slot transmission occasion.

The transmission component 1204 may transmit a set of repetitions of the uplink transmission, wherein each repetition of the set of repetitions is transmitted in a different multi-slot transmission occasion. The transmission component 1204 may transmit a capability report that indicates at least one of a capability of the UE to support multi-slot transmission occasions; a maximum span, supported by the UE, of time domain resources for a single multi-slot transmission occasion; a maximum time gap, supported by the UE, between consecutive sets of contiguous time domain resources; a maximum time gap, supported by the UE, between consecutive multi-slot transmission occasions; a requirement to use a single RV index for a single multi-slot transmission occasion; a requirement to use RV cycling across non-consecutive sets of contiguous time domain resources included in a single multi-slot transmission occasion; a requirement to use RV cycling across different slots included in a single multi-slot transmission occasion; or a combination thereof. The reception component 1202 may receive the indication of the one or more sets of contiguous time domain resources for the multi-slot transmission occasion based at least in part on the capability report.

The RV identification component 1208 may identify an RV and/or an RV index to be used for an uplink transmission according to one or more techniques described herein.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
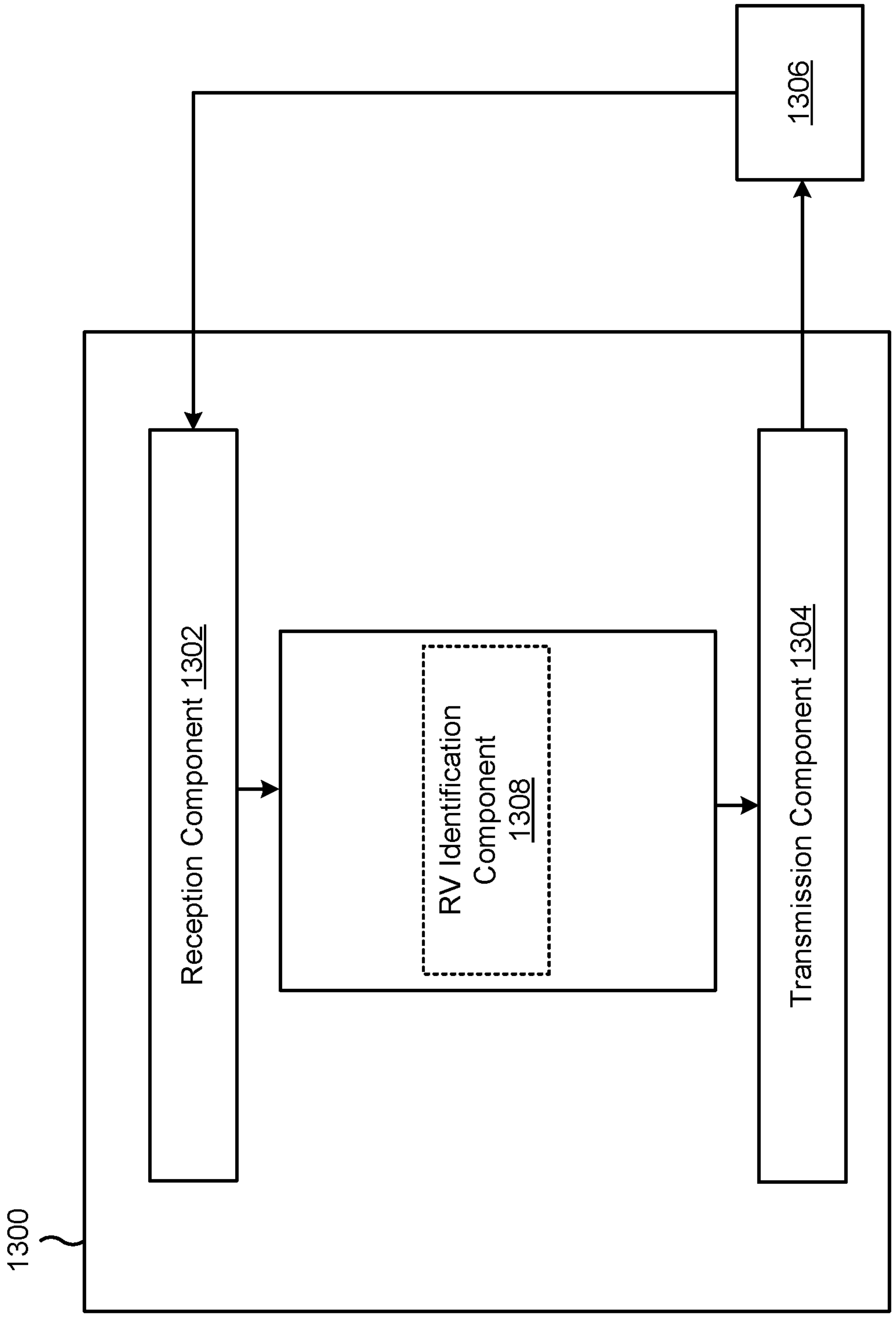

FIG. 13 is a block diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include an RV identification component 1308, among other examples.

In some aspects, the apparatus 1300 may be configured to perform one or more operations described herein. Additionally, or alternatively, the apparatus 1300 may be configured to perform one or more processes described herein, such as process 700 of FIG. 7. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit, to a UE, an indication of one or more sets of contiguous time domain resources for a multi-slot transmission occasion that spans multiple slots. The reception component 1302 may receive an uplink transmission from the UE in the multi-slot transmission occasion.

The transmission component 1304 may transmit an indication of a number of repetitions of the uplink transmission to be transmitted by the UE. The reception component 1302 may receive a set of repetitions of the uplink transmission based at least in part on the indication of the number of repetitions, wherein each repetition of the set of repetitions is received in a different multi-slot transmission occasion. The transmission component 1304 may transmit an indication of a time gap between consecutive multi-slot transmission occasions to be used for repetitions of the uplink transmission. The reception component 1302 may receive a set of repetitions of the uplink transmission based at least in part on the indication of the time gap, wherein each repetition of the set of repetitions is received in a different multi-slot transmission occasion.

The reception component 1302 may receive a set of repetitions of the uplink transmission, wherein each repetition of the set of repetitions is received in a different multi-slot transmission occasion. The reception component 1302 may receive a capability report that indicates at least one of a capability of the UE to support multi-slot transmission occasions; a maximum span, supported by the UE, of time domain resources for a single multi-slot transmission occasion; a maximum time gap, supported by the UE, between consecutive sets of contiguous time domain resources; a maximum time gap, supported by the UE, between consecutive multi-slot transmission occasions; a requirement to use a single RV index for a single multi-slot transmission occasion; a requirement to use RV cycling across non-consecutive sets of contiguous time domain resources included in a single multi-slot transmission occasion; a requirement to use RV cycling across different slots included in a single multi-slot transmission occasion; or a combination thereof. The transmission component 1304 may transmit the indication of the one or more sets of contiguous time domain resources for the multi-slot transmission occasion based at least in part on the capability report.

The RV identification component 1308 may identify an RV and/or an RV index to be used for an uplink transmission according to one or more techniques described herein.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
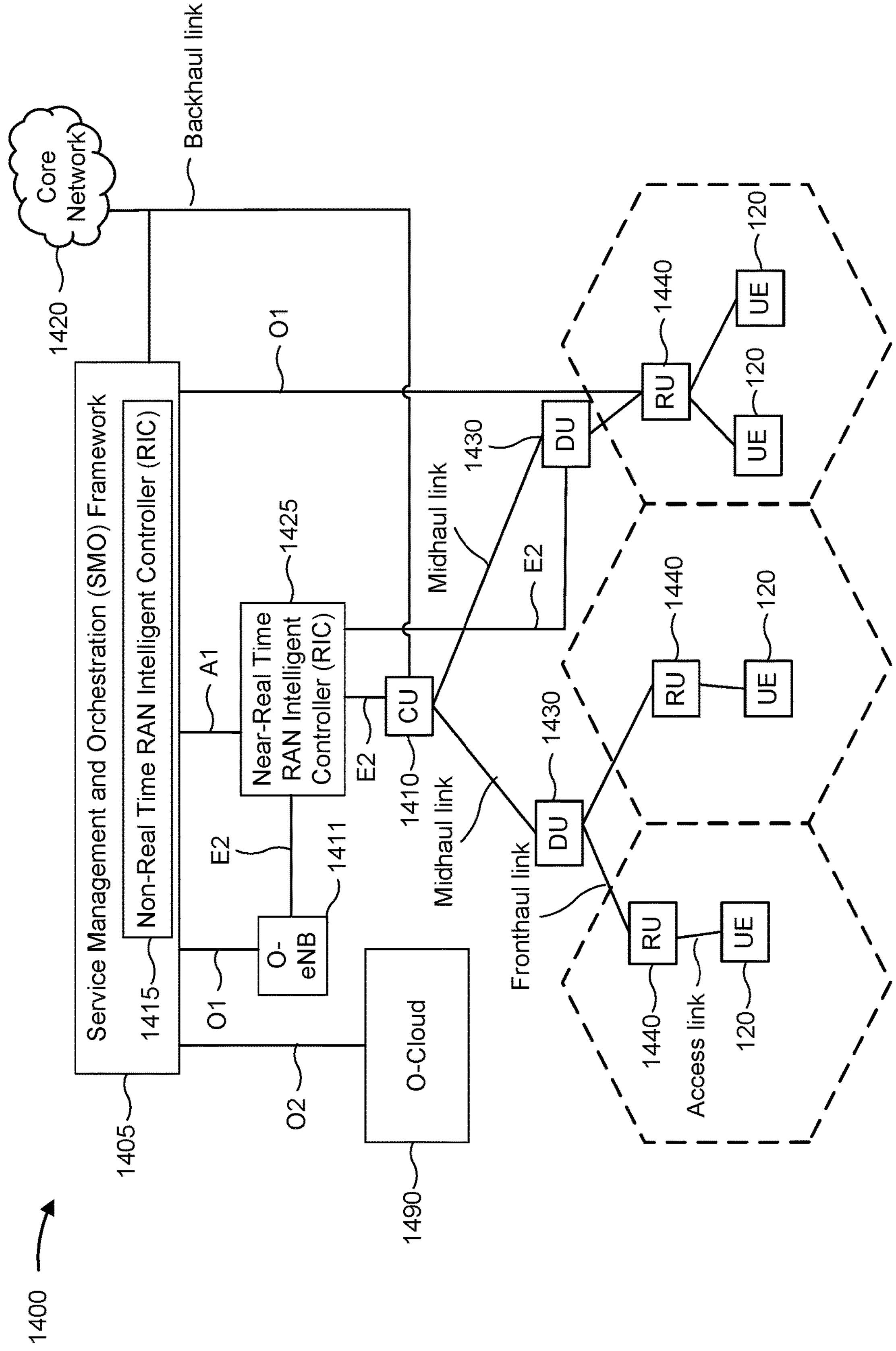
FIG. 14 is a diagram illustrating an example disaggregated base station architecture, in accordance with the present disclosure.

FIG. 14 is a diagram illustrating an example 1400 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs. In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 14 may include one or more CUs 1410 that can communicate directly with a core network 1420 via a backhaul link, or indirectly with the core network 1420 through one or more disaggregated base station units (such as a Near-Real Time (Near-RT) RAN Intelligent Controller (RIC) 1425 via an E2 link, or a Non-Real Time (Non-RT) RIC 1415 associated with a Service Management and Orchestration (SMO) Framework 1405, or both). A CU 1410 may communicate with one or more DUs 1430 via respective midhaul links, such as an F1 interface. The DUs 1430 may communicate with one or more RUs 1440 via respective fronthaul links. The RUs 1440 may communicate with respective UEs 120 via one or more radio frequency (RF) access links. In some implementations, the UE 120 may be simultaneously served by multiple RUs 1440.

Each of the units (e.g., the CUs 1410, the DUs 1430, the RUs 1440), as well as the Near-RT RICs 1425, the Non-RT RICs 1415, and the SMO Framework 1405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1410 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 1410. The CU 1410 may be configured to handle user plane functionality (e.g., Central Unit-User Plane (CU-UP)), control plane functionality (e.g., Central Unit-Control Plane (CU-CP)), or a combination thereof. In some implementations, the CU 1410 can be logically split into one or more CU-UP units and one or more CU-CP units. The CU-UP unit can communicate bidirectionally with the CU-CP unit via an interface, such as the E1 interface when implemented in an O-RAN configuration. The CU 1410 can be implemented to communicate with the DU 1430, as necessary, for network control and signaling.

The DU 1430 may correspond to a logical unit that includes one or more base station functions to control the operation of one or more RUs 1440. In some aspects, the DU 1430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1430 may further host one or more low-PHY layers. Each layer (or module) can be implemented with an interface configured to communicate signals with other layers (and modules) hosted by the DU 1430, or with the control functions hosted by the CU 1410.

Lower-layer functionality can be implemented by one or more RUs 1440. In some deployments, an RU 1440, controlled by a DU 1430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1440 can be implemented to handle over the air (OTA) communication with one or more UEs 120. In some implementations, real-time and non-real-time aspects of control and user plane communication with the RU(s) 1440 can be controlled by the corresponding DU 1430. In some scenarios, this configuration can enable the DU(s) 1430 and the CU 1410 to be implemented in a cloud-based RAN architecture, such as a vRAN architecture.

The SMO Framework 1405 may be configured to support RAN deployment and provisioning of non-virtualized and virtualized network elements. For non-virtualized network elements, the SMO Framework 1405 may be configured to support the deployment of dedicated physical resources for RAN coverage requirements which may be managed via an operations and maintenance interface (such as an O1 interface). For virtualized network elements, the SMO Framework 1405 may be configured to interact with a cloud computing platform (such as an open cloud (O-Cloud) 1490) to perform network element life cycle management (such as to instantiate virtualized network elements) via a cloud computing platform interface (such as an O2 interface). Such virtualized network elements can include, but are not limited to, CUs 1410, DUs 1430, RUs 1440 and Near-RT RICs 1425. In some implementations, the SMO Framework 1405 can communicate with a hardware aspect of a 4G RAN, such as an open eNB (O-eNB) 1111, via an O1 interface. Additionally, in some implementations, the SMO Framework 1405 can communicate directly with one or more RUs 1440 via an O1 interface. The SMO Framework 1405 also may include a Non-RT RIC 1415 configured to support functionality of the SMO Framework 1405.

The Non-RT RIC 1415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1425. The Non-RT RIC 1415 may be coupled to or communicate with (such as via an A1 interface) the Near-RT RIC 1425. The Near-RT RIC 1425 may be configured to include a logical function that enables near-real-time control and optimization of RAN elements and resources via data collection and actions over an interface (such as via an E2 interface) connecting one or more CUs 1410, one or more DUs 1430, or both, as well as an O-eNB, with the Near-RT RIC 1425.

In some implementations, to generate AI/ML models to be deployed in the Near-RT RIC 1425, the Non-RT RIC 1415 may receive parameters or external enrichment information from external servers. Such information may be utilized by the Near-RT RIC 1425 and may be received at the SMO Framework 1405 or the Non-RT RIC 1415 from non-network data sources or from network functions. In some examples, the Non-RT RIC 1415 or the Near-RT RIC 1425 may be configured to tune RAN behavior or performance. For example, the Non-RT RIC 1415 may monitor long-term trends and patterns for performance and employ AI/ML models to perform corrective actions through the SMO Framework 1405 (such as reconfiguration via 01) or via creation of RAN management policies (such as A1 policies).

As indicated above, FIG. 14 is provided as an example. Other examples may differ from what is described with regard to FIG. 14.

The following provides an overview of some Aspects of the present disclosure:

Aspect 1: A method of wireless communication performed by a user equipment (UE), comprising: receiving an indication of one or more sets of contiguous time domain resources for a multi-slot transmission occasion that spans multiple slots; and transmitting an uplink transmission in the multi-slot transmission occasion.

Aspect 2: The method of Aspect 1, wherein the uplink transmission is a physical uplink shared channel (PUSCH) transmission that includes a single transport block, and wherein the multi-slot transmission occasion is a multi-slot PUSCH transmission occasion.

Aspect 3: The method of any of Aspects 1-2, wherein different sets of contiguous time domain resources are non-contiguous with one another.

Aspect 4: The method of any of Aspects 1-3, wherein the one or more sets of contiguous time domain resources for the multi-slot transmission occasion consist of a single set of contiguous time domain resources that span one or more contiguous slots.

Aspect 5: The method of any of Aspects 1-3, wherein the one or more sets of contiguous time domain resources for the multi-slot transmission occasion comprise multiple sets of contiguous time domain resources, wherein each set of contiguous time domain resources spans one or more contiguous slots, and wherein different sets of contiguous time domain resources are not contiguous with one another.

Aspect 6: The method of any of Aspects 1-5, further comprising: receiving an indication of a number of repetitions of the uplink transmission to be transmitted by the UE; and transmitting a set of repetitions of the uplink transmission based at least in part on the indication of the number of repetitions, wherein each repetition of the set of repetitions is transmitted in a different multi-slot transmission occasion.

Aspect 7: The method of any of Aspects 1-6, wherein the indication of the one or more sets of contiguous time domain resources for the multi-slot transmission occasion includes a time domain resource allocation (TDRA) for the multi-slot transmission occasion.

Aspect 8: The method of Aspect 7, wherein the TDRA is indicated using a first value that indicates a starting symbol of the multi-slot transmission occasion, a second value that indicates a length of the multi-slot transmission occasion, and a third value that indicates a quantity of slots associated with the multi-slot transmission occasion.

Aspect 9: The method of Aspect 7, wherein: the TDRA is indicated using a set of values for a single set of contiguous time domain resources that span two or more contiguous slots of the multi-slot transmission occasion, wherein the set of values includes a first value that indicates a starting symbol of the multi-slot transmission occasion and a second value that indicates a length of the multi-slot transmission occasion; or the TDRA is indicated using multiple sets of values corresponding to multiple sets of contiguous time domain resources of the multi-slot transmission occasion, wherein each set of values includes a first value that indicates a starting slot of the multi-slot transmission occasion, a second value that indicates a starting symbol of the multi-slot transmission occasion within the starting slot, and a third value that indicates a length of the multi-slot transmission occasion.

Aspect 10: The method of Aspect 9, wherein the first value that indicates the starting slot includes a slot index relative to a reference slot.

Aspect 11: The method of Aspect 10, wherein the reference slot is a slot in which an uplink grant for the uplink transmission is received.

Aspect 12: The method of Aspect 10, wherein the reference slot is a slot indicated in an uplink grant as a starting slot of the multi-slot transmission occasion.

Aspect 13: The method of any of Aspects 1-12, further comprising: receiving an indication of a time gap between consecutive multi-slot transmission occasions to be used for repetitions of the uplink transmission; and transmitting a set of repetitions of the uplink transmission based at least in part on the indication of the time gap, wherein each repetition of the set of repetitions is transmitted in a different multi-slot transmission occasion.

Aspect 14: The method of Aspect 13, wherein the time gap is indicated using a periodicity or an offset.

Aspect 15: The method of Aspect 13, wherein the time gap is indicated as a number of symbols or a number of slots.

Aspect 16: The method of any of Aspects 13-15, wherein the time gap indicates a gap between an end of one multi-slot transmission occasion and a beginning of a next consecutive multi-slot transmission occasion.

Aspect 17: The method of any of Aspects 13-15, wherein the time gap indicates a gap between a beginning of one multi-slot transmission occasion and a beginning of a next consecutive multi-slot transmission occasion.

Aspect 18: The method of any of Aspects 1-17, further comprising transmitting a set of repetitions of the uplink transmission, wherein each repetition of the set of repetitions is transmitted in a different multi-slot transmission occasion.

Aspect 19: The method of Aspect 18, wherein a single redundancy version index is used for the multi-slot transmission occasion, and wherein different redundancy version indexes are used for different multi-slot transmission occasions.

Aspect 20: The method of Aspect 18, wherein the one or more sets of contiguous time domain resources for the multi-slot transmission occasion comprises multiple sets of contiguous time domain resources, wherein a single redundancy version index is used for a set of contiguous time domain resources of the multiple sets of contiguous time domain resources, and wherein different redundancy version indexes are used for different sets of contiguous time domain resources included in the multiple sets of contiguous time domain resources.

Aspect 21: The method of Aspect 18, wherein a single redundancy version index is used for all symbols in a single slot included in the multiple slots of the multi-slot transmission occasion, and wherein different redundancy version indexes are used for different slots included in the multiple slots of the multi-slot transmission occasion.

Aspect 22: The method of any of Aspects 1-21, wherein a same redundancy version (RV) cycling pattern is applied for inter-transmission occasion RV cycling and for intra-transmission occasion RV cycling, wherein inter-transmission occasion RV cycling comprises cycling an RV index across multi-slot transmission occasions, and intra-transmission occasion RV cycling comprises cycling an RV index within a single multi-slot transmission occasion.

Aspect 23: The method of any of Aspects 1-21, wherein a first redundancy version (RV) cycling pattern is applied to inter-transmission occasion RV cycling and a second RV cycling pattern is applied to intra-transmission occasion RV cycling, wherein the first RV cycling pattern is different from the second RV cycling pattern, wherein inter-transmission occasion RV cycling comprises cycling an RV index across multi-slot transmission occasions, and intra-transmission occasion RV cycling comprises cycling an RV index within a single multi-slot transmission occasion.

Aspect 24: The method of any of Aspects 1-23, further comprising transmitting a capability report that indicates at least one of: a capability of the UE to support multi-slot transmission occasions; a maximum span, supported by the UE, of time domain resources for a single multi-slot transmission occasion; a maximum time gap, supported by the UE, between consecutive sets of contiguous time domain resources; a maximum time gap, supported by the UE, between consecutive multi-slot transmission occasions; a requirement to use a single redundancy version (RV) index for a single multi-slot transmission occasion; a requirement to use RV cycling across non-consecutive sets of contiguous time domain resources included in a single multi-slot transmission occasion; a requirement to use RV cycling across different slots included in a single multi-slot transmission occasion; or a combination thereof.

Aspect 25: The method of Aspect 24, further comprising receiving the indication of the one or more sets of contiguous time domain resources for the multi-slot transmission occasion based at least in part on the capability report.

Aspect 26: The method of any of Aspects 1-25, wherein the indication of the one or more sets of contiguous time domain resources for the multi-slot transmission occasion is included in downlink control information or an uplink grant for the uplink transmission.

Aspect 27: The method of any of Aspects 1-26, wherein the indication of the one or more sets of contiguous time domain resources for the multi-slot transmission occasion is included in a radio resource control (RRC) configuration message.

Aspect 28: A method of wireless communication performed by a network entity, comprising: transmitting, to a user equipment (UE), an indication of one or more sets of contiguous time domain resources for a multi-slot transmission occasion that spans multiple slots; and receiving an uplink transmission from the UE in the multi-slot transmission occasion.

Aspect 29: The method of Aspect 28, wherein the uplink transmission is a physical uplink shared channel (PUSCH) transmission that includes a single transport block, and wherein the multi-slot transmission occasion is a multi-slot PUSCH transmission occasion.

Aspect 30: The method of any of Aspects 28-29, wherein different sets of contiguous time domain resources are non-contiguous with one another.

Aspect 31: The method of any of Aspects 28-30, wherein the one or more sets of contiguous time domain resources for the multi-slot transmission occasion consist of a single set of contiguous time domain resources that span two or more contiguous slots.

Aspect 32: The method of any of Aspects 28-30, wherein the one or more sets of contiguous time domain resources for the multi-slot transmission occasion comprise multiple sets of contiguous time domain resources, wherein each set of contiguous time domain resources spans two or more contiguous slots, and wherein different sets of contiguous time domain resources are not contiguous with one another.

Aspect 33: The method of any of Aspects 28-32, further comprising: transmitting an indication of a number of repetitions of the uplink transmission to be transmitted by the UE; and receiving a set of repetitions of the uplink transmission based at least in part on the indication of the number of repetitions, wherein each repetition of the set of repetitions is received in a different multi-slot transmission occasion.

Aspect 34: The method of any of Aspects 28-33, wherein the indication of the one or more sets of contiguous time domain resources for the multi-slot transmission occasion includes a time domain resource allocation (TDRA) for the multi-slot transmission occasion.

Aspect 35: The method of Aspect 34, wherein the TDRA is indicated using a first value that indicates a starting symbol of the multi-slot transmission occasion, a second value that indicates a length of the multi-slot transmission occasion, and a third value that indicates a quantity of slots associated with the multi-slot transmission occasion.

Aspect 36: The method of Aspect 34, wherein: the TDRA is indicated using a set of values for a single set of contiguous time domain resources that span two or more contiguous slots of the multi-slot transmission occasion, wherein the set of values includes a first value that indicates a starting symbol of the multi-slot transmission occasion and a second value that indicates a length of the multi-slot transmission occasion; or the TDRA is indicated using multiple sets of values corresponding to multiple sets of contiguous time domain resources of the multi-slot transmission occasion, wherein each set of values includes a first value that indicates a starting slot of the multi-slot transmission occasion, a second value that indicates a starting symbol of the multi-slot transmission occasion within the starting slot, and a third value that indicates a length of the multi-slot transmission occasion.

Aspect 37: The method of Aspect 36, wherein the first value that indicates the starting slot includes a slot index relative to a reference slot.

Aspect 38: The method of Aspect 37, wherein the reference slot is a slot in which an uplink grant for the uplink transmission is received.

Aspect 39: The method of Aspect 37, wherein the reference slot is a slot indicated in an uplink grant as a starting slot of the multi-slot transmission occasion.

Aspect 40: The method of any of Aspects 28-39, further comprising: transmitting an indication of a time gap between consecutive multi-slot transmission occasions to be used for repetitions of the uplink transmission; and receiving a set of repetitions of the uplink transmission based at least in part on the indication of the time gap, wherein each repetition of the set of repetitions is received in a different multi-slot transmission occasion.

Aspect 41: The method of Aspect 40, wherein the time gap is indicated using a periodicity or an offset.

Aspect 42: The method of Aspect 40, wherein the time gap is indicated as a number of symbols or a number of slots.

Aspect 43: The method of any of Aspects 40-42, wherein the time gap indicates a gap between an end of one multi-slot transmission occasion and a beginning of a next consecutive multi-slot transmission occasion.

Aspect 44: The method of any of Aspects 40-42, wherein the time gap indicates a gap between a beginning of one multi-slot transmission occasion and a beginning of a next consecutive multi-slot transmission occasion.

Aspect 45: The method of any of Aspects 28-44, further comprising receiving a set of repetitions of the uplink transmission, wherein each repetition of the set of repetitions is received in a different multi-slot transmission occasion.

Aspect 46: The method of Aspect 45, wherein a single redundancy version index is used for the multi-slot transmission occasion, and wherein different redundancy version indexes are used for different multi-slot transmission occasions.

Aspect 47: The method of Aspect 45, wherein the one or more sets of contiguous time domain resources for the multi-slot transmission occasion comprise multiple sets of contiguous time domain resources, wherein a single redundancy version index is used for a set of contiguous time domain resources of the multiple sets of contiguous time domain resources, and wherein different redundancy version indexes are used for different sets of contiguous time domain resources included in the multiple sets of contiguous time domain resources.

Aspect 48: The method of Aspect 45, wherein a single redundancy version index is used for all symbols in a single slot included in the multiple slots of the multi-slot transmission occasion, and wherein different redundancy version indexes are used for different slots included in the multiple slots of the multi-slot transmission occasion.

Aspect 49: The method of any of Aspects 28-48, wherein a same redundancy version (RV) cycling pattern is applied for inter-transmission occasion RV cycling and for intra-transmission occasion RV cycling, wherein inter-transmission occasion RV cycling comprises cycling an RV index across multi-slot transmission occasions, and intra-transmission occasion RV cycling comprises cycling an RV index within a single multi-slot transmission occasion.

Aspect 50: The method of any of Aspects 28-48, wherein a first redundancy version (RV) cycling pattern is applied to inter-transmission occasion RV cycling and a second RV cycling pattern is applied to intra-transmission occasion RV cycling, wherein the first RV cycling pattern is different from the second RV cycling pattern, wherein inter-transmission occasion RV cycling comprises cycling an RV index across multi-slot transmission occasions, and intra-transmission occasion RV cycling comprises cycling an RV index within a single multi-slot transmission occasion.

Aspect 51: The method of any of Aspects 28-50, further comprising receiving a capability report that indicates at least one of: a capability of the UE to support multi-slot transmission occasions; a maximum span, supported by the UE, of time domain resources for a single multi-slot transmission occasion, a maximum time gap, supported by the UE, between consecutive sets of contiguous time domain resources, a maximum time gap, supported by the UE, between consecutive multi-slot transmission occasions, a requirement to use a single redundancy version (RV) index for a single multi-slot transmission occasion, a requirement to use RV cycling across non-consecutive sets of contiguous time domain resources included in a single multi-slot transmission occasion, a requirement to use RV cycling across different slots included in a single multi-slot transmission occasion, or a combination thereof.

Aspect 52: The method of Aspect 51, further comprising transmitting the indication of the one or more sets of contiguous time domain resources for the multi-slot transmission occasion based at least in part on the capability report.

Aspect 53: The method of any of Aspects 28-52, wherein the indication of the one or more sets of contiguous time domain resources for the multi-slot transmission occasion is included in downlink control information or an uplink grant for the uplink transmission.

Aspect 54: The method of any of Aspects 28-53, wherein the indication of the one or more sets of contiguous time domain resources for the multi-slot transmission occasion is included in a radio resource control (RRC) configuration message.

Aspect 55: An apparatus for wireless communication at a device, comprising a processor; memory coupled with the processor; and instructions stored in the memory and executable by the processor to cause the apparatus to perform the method of one or more of Aspects 1-27.

Aspect 56: A device for wireless communication, comprising a memory and one or more processors coupled to the memory, the memory and the one or more processors configured to perform the method of one or more of Aspects 1-27.

Aspect 57: An apparatus for wireless communication, comprising at least one means for performing the method of one or more of Aspects 1-27.

Aspect 58: A non-transitory computer-readable medium storing code for wireless communication, the code comprising instructions executable by a processor to perform the method of one or more of Aspects 1-27.

Aspect 59: A non-transitory computer-readable medium storing a set of instructions for wireless communication, the set of instructions comprising one or more instructions that, when executed by one or more processors of a device, cause the device to perform the method of one or more of Aspects 1-27.

Aspect 60: An apparatus for wireless communication at a device, comprising a processor; memory coupled with the processor; and instructions stored in the memory and executable by the processor to cause the apparatus to perform the method of one or more of Aspects 28-54.

Aspect 61: A device for wireless communication, comprising a memory and one or more processors coupled to the memory, the memory and the one or more processors configured to perform the method of one or more of Aspects 28-54.

Aspect 62: An apparatus for wireless communication, comprising at least one means for performing the method of one or more of Aspects 28-54.

Aspect 63: A non-transitory computer-readable medium storing code for wireless communication, the code comprising instructions executable by a processor to perform the method of one or more of Aspects 28-54.

Aspect 64: A non-transitory computer-readable medium storing a set of instructions for wireless communication, the set of instructions comprising one or more instructions that, when executed by one or more processors of a device, cause the device to perform the method of one or more of Aspects 28-54.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, the one or more processors individually or collectively configured to:

transmit a capability report that indicates a capability of the UE to support transmission of a set of repetitions of an uplink transmission, comprising a physical uplink shared channel (PUSCH) transmission, in multi-slot transmission occasions;

receive an indication, based at least in part on the capability report, of one or more sets of contiguous time domain resources for a multi-slot transmission occasion that spans multiple slots;

receive an indication of a time gap between consecutive multi-slot transmission occasions to be used for repetitions of an uplink transmission; and transmit the set of repetitions of the uplink transmission in the multi-slot transmission occasions based at least in part on the capability report and based at least in part on the indication of the time gap.

2. The UE of claim 1, wherein the PUSCH transmission includes a single transport block, and wherein the multi-slot transmission occasion is a multi-slot PUSCH transmission occasion.

3. The UE of claim 1, wherein different sets of contiguous time domain resources are non-contiguous with one another.

4. The UE of claim 1, wherein the one or more sets of contiguous time domain resources for the multi-slot transmission occasion consists of a single set of contiguous time domain resources that span one or more contiguous slots.

5. The UE of claim 1, wherein the one or more sets of contiguous time domain resources for the multi-slot transmission occasion comprises multiple sets of contiguous time domain resources, wherein each set of contiguous time domain resources spans one or more contiguous slots, and wherein different sets of contiguous time domain resources are not contiguous with one another.

6. The UE of claim 1, wherein the one or more processors are further configured to:

receive an indication of a number of repetitions of the uplink transmission to be transmitted by the UE; and transmit the set of repetitions of the uplink transmission based at least in part on the indication of the number of repetitions, wherein each repetition of the set of repetitions of the uplink transmission is transmitted in a different multi-slot transmission occasion.

7. The UE of claim 1, wherein the indication of the one or more sets of contiguous time domain resources for the multi-slot transmission occasion includes a time domain resource allocation (TDRA) for the multi-slot transmission occasion.

8. The UE of claim 7, wherein:

the TDRA is indicated using a first value that indicates a starting slot of the multi-slot transmission occasion, a second value that indicates a length of the multi-slot transmission occasion, and a third value that indicates a quantity of slots associated with the multi-slot transmission occasion.

9. The UE of claim 8, wherein the first value that indicates the starting slot includes a slot index relative to a reference slot, and wherein the reference slot is a slot in which an uplink grant for the uplink transmission is received or the reference slot is a slot indicated in an uplink grant as a starting slot of the multi-slot transmission occasion.

10. The UE of claim 1, wherein the one or more processors are further configured to:

transmit the set of repetitions of the uplink transmission based at least in part on the indication of the time gap, wherein each repetition of the set of repetitions of the uplink transmission is transmitted in a different multi-slot transmission occasion.

11. The UE of claim 10, wherein:

the time gap is indicated using a periodicity or an offset;

the time gap is indicated as a number of symbols or a number of slots;

the time gap indicates a gap between an end of one multi-slot transmission occasion and a beginning of a next consecutive multi-slot transmission occasion; or the time gap indicates a gap between a beginning of one multi-slot transmission occasion and a beginning of a next consecutive multi-slot transmission occasion.

12. The UE of claim 1, wherein the one or more processors are further configured to transmit the set of repetitions of the uplink transmission, wherein each repetition of the set of repetitions of the uplink transmission is transmitted in a different multi-slot transmission occasion.

13. The UE of claim 12, wherein:

a single redundancy version index is used for the multi-slot transmission occasion, and wherein different redundancy version indexes are used for different multi-slot transmission occasions; or a single redundancy version index is used for all symbols in a single slot included in the multiple slots of the multi-slot transmission occasion, and wherein different redundancy version indexes are used for different slots included in the multiple slots of the multi-slot transmission occasion.

14. The UE of claim 12, wherein the one or more sets of contiguous time domain resources for the multi-slot transmission occasion comprises multiple sets of contiguous time domain resources, and wherein a single redundancy version index is used for a set of contiguous time domain resources of the multiple sets of contiguous time domain resources, and wherein different redundancy version indexes are used for different sets of contiguous time domain resources included in the multiple sets of contiguous time domain resources.

15. The UE of claim 1, wherein:

a same redundancy version (RV) cycling pattern is applied for inter-transmission occasion RV cycling and for intra-transmission occasion RV cycling, wherein inter-transmission occasion RV cycling comprises cycling an RV index across multi-slot transmission occasions, and intra-transmission occasion RV cycling comprises cycling an RV index within a single multi-slot transmission occasion; or a first redundancy version (RV) cycling pattern is applied to inter-transmission occasion RV cycling and a second RV cycling pattern is applied to intra-transmission occasion RV cycling, wherein the first RV cycling pattern is different from the second RV cycling pattern, wherein inter-transmission occasion RV cycling comprises cycling an RV index across multi-slot transmission occasions, and intra-transmission occasion RV cycling comprises cycling an RV index within a single multi-slot transmission occasion.

16. The UE of claim 1, wherein:

the indication of the one or more sets of contiguous time domain resources for the multi-slot transmission occasion is included in downlink control information or an uplink grant for the uplink transmission; or the indication of the one or more sets of contiguous time domain resources for the multi-slot transmission occasion is included in a radio resource control (RRC) configuration message.

17. A network entity for wireless communication, comprising:

one or more memories; and one or more processors coupled to the one or more memories, the one or more processors individually or collectively configured to:

receive a capability report that indicates a capability of a user equipment (UE) to support transmission of a set of repetitions of an uplink transmission, comprising a physical uplink shared channel (PUSCH) transmission, in multi-slot transmission occasions;

transmit, to the UE, an indication, based at least in part on the capability report, of one or more sets of contiguous time domain resources for a multi-slot transmission occasion that spans multiple slots;

transmit an indication of a time gap between consecutive multi-slot transmission occasions to be used for repetitions of an uplink transmission; and receive the set of repetitions of the uplink transmission in the multi-slot transmission occasions based at least in part on the capability report and based at least in part on the indication of the time gap.

18. The network entity of claim 17, wherein:

the PUSCH transmission includes a single transport block, and wherein the multi-slot transmission occasion is a multi-slot PUSCH transmission occasion; or different sets of contiguous time domain resources are non-contiguous with one another.

19. The network entity of claim 17, wherein:

the one or more sets of contiguous time domain resources for the multi-slot transmission occasion consists of a single set of contiguous time domain resources that span one or more contiguous slots; or the one or more sets of contiguous time domain resources for the multi-slot transmission occasion comprises multiple sets of contiguous time domain resources, wherein each set of contiguous time domain resources spans one or more contiguous slots, and wherein different sets of contiguous time domain resources are not contiguous with one another.

20. The network entity of claim 17, wherein the one or more processors are further configured to:

transmit an indication of a number of repetitions of the uplink transmission to be transmitted by the UE; and receive the set of repetitions of the uplink transmission based at least in part on the indication of the number of repetitions, wherein each repetition of the set of repetitions of the uplink transmission is received in a different multi-slot transmission occasion.

21. The network entity of claim 17, wherein the indication of the one or more sets of contiguous time domain resources for the multi-slot transmission occasion includes a time domain resource allocation (TDRA) for the multi-slot transmission occasion.

22. The network entity of claim 21, wherein:

the TDRA is indicated using a first value that indicates a starting slot of the multi-slot transmission occasion, a second value that indicates a length of the multi-slot transmission occasion, and a third value that indicates a quantity of slots associated with the multi-slot transmission occasion.

23. The network entity of claim 22, wherein the first value that indicates the starting slot includes a slot index relative to a reference slot, and wherein the reference slot is a slot in which an uplink grant for the uplink transmission is received or the reference slot is a slot indicated in an uplink grant as a starting slot of the multi-slot transmission occasion.

24. The network entity of claim 17, wherein the one or more processors are further configured to:

receive the set of repetitions of the uplink transmission based at least in part on the indication of the time gap, wherein each repetition of the set of repetitions of the uplink transmission is received in a different multi-slot transmission occasion.

25. The network entity of claim 24, wherein:

the time gap is indicated using a periodicity or an offset;

the time gap is indicated as a number of symbols or a number of slots;

the time gap indicates a gap between an end of one multi-slot transmission occasion and a beginning of a next consecutive multi-slot transmission occasion; or the time gap indicates a gap between a beginning of one multi-slot transmission occasion and a beginning of a next consecutive multi-slot transmission occasion.

26. The network entity of claim 17, wherein the one or more processors are further configured to receive the set of repetitions of the uplink transmission, wherein each repetition of the set of repetitions of the uplink transmission is received in a different multi-slot transmission occasion, wherein:

a single redundancy version index is used for the multi-slot transmission occasion, and wherein different redundancy version indexes are used for different multi-slot transmission occasions; or a single redundancy version index is used for all symbols in a single slot included in the multiple slots of the multi-slot transmission occasion, and wherein different redundancy version indexes are used for different slots included in the multiple slots of the multi-slot transmission occasion.

27. The network entity of claim 26, wherein the one or more sets of contiguous time domain resources for the multi-slot transmission occasion comprises multiple sets of contiguous time domain resources, and wherein a single redundancy version index is used for a set of contiguous time domain resources of the multiple sets of contiguous time domain resources, and wherein different redundancy version indexes are used for different sets of contiguous time domain resources included in the multiple sets of contiguous time domain resources.

28. The network entity of claim 17, wherein:

a same redundancy version (RV) cycling pattern is applied for inter-transmission occasion RV cycling and for intra-transmission occasion RV cycling, wherein inter-transmission occasion RV cycling comprises cycling an RV index across multi-slot transmission occasions, and intra-transmission occasion RV cycling comprises cycling an RV index within a single multi-slot transmission occasion;

a first RV cycling pattern is applied to inter-transmission occasion RV cycling and a second RV cycling pattern is applied to intra-transmission occasion RV cycling, wherein the first RV cycling pattern is different from the second RV cycling pattern, wherein inter-transmission occasion RV cycling comprises cycling an RV index across multi-slot transmission occasions, and intra-transmission occasion RV cycling comprises cycling an RV index within a single multi-slot transmission occasion;

the indication of the one or more sets of contiguous time domain resources for the multi-slot transmission occasion is included in downlink control information or an uplink grant for the uplink transmission; or the indication of the one or more sets of contiguous time domain resources for the multi-slot transmission occasion is included in a radio resource control (RRC) configuration message.

29. A method of wireless communication performed by a user equipment (UE), comprising:

transmitting a capability report that indicates a capability of the UE to support transmission of a set of repetitions of an uplink transmission, comprising a physical uplink shared channel (PUSCH) transmission, in multi-slot transmission occasions;

receiving an indication, based at least in part on the capability report, of one or more sets of contiguous time domain resources for a multi-slot transmission occasion that spans multiple slots;

receiving an indication of a time gap between consecutive multi-slot transmission occasions to be used for repetitions of an uplink transmission; and transmitting the set of repetitions of the uplink transmission in the multi-slot transmission occasions based at least in part on the capability report and based at least in part on the indication of the time gap.

30. A method of wireless communication performed by a network entity, comprising:

receiving a capability report that indicates a capability of a user equipment (UE) to support transmission of a set of repetitions of an uplink transmission, comprising a physical uplink shared channel (PUSCH) transmission, in multi-slot transmission occasions;

transmitting, to the UE, an indication, based at least in part on the capability report, of one or more sets of contiguous time domain resources for a multi-slot transmission occasion that spans multiple slots;

transmitting an indication of a time gap between consecutive multi-slot transmission occasions to be used for repetitions of an uplink transmission; and receiving the set of repetitions of the uplink transmission in the multi-slot transmission occasions based at least in part on the capability report and based at least in part on the indication of the time gap.

* * * * *